United States Patent
Hadani

(10) Patent No.: US 11,063,804 B2
(45) Date of Patent: Jul. 13, 2021

(54) DIGITAL COMMUNICATION USING LATTICE DIVISION MULTIPLEXING

(71) Applicant: Cohere Technologies, Inc., Santa Clara, CA (US)

(72) Inventor: Ronny Hadani, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/607,347

(22) PCT Filed: Apr. 24, 2018

(86) PCT No.: PCT/US2018/029209
§ 371 (c)(1),
(2) Date: Oct. 22, 2019

(87) PCT Pub. No.: WO2018/200577
PCT Pub. Date: Nov. 1, 2018

(65) Prior Publication Data
US 2020/0313949 A1   Oct. 1, 2020

Related U.S. Application Data

(60) Provisional application No. 62/489,401, filed on Apr. 24, 2017.

(51) Int. Cl.
*H04L 27/26* (2006.01)
*H04L 1/00* (2006.01)
(Continued)

(52) U.S. Cl.
CPC ........ *H04L 27/2627* (2013.01); *H04L 1/0003* (2013.01); *H04L 5/0005* (2013.01);
(Continued)

(58) Field of Classification Search
CPC . H04L 5/0048; H04L 5/0007; H04L 27/2601; H04L 27/2602
(Continued)

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

Supplemental European Search Report EP 18 78 9792, dated Nov. 19, 2020, 9 pages.

(Continued)

*Primary Examiner* — Shuwang Liu
*Assistant Examiner* — Gina M Mckie
(74) *Attorney, Agent, or Firm* — Perkins Coie, LLP

(57) ABSTRACT

A wireless data transmission technique includes encoding information bits as a periodic sequence of quadrature amplitude modulation (QAM) symbols, convolving the periodic sequence with a periodic pulse function, thereby generating a filtered periodic sequence, transforming the filtered periodic sequence to a delay-Doppler domain waveform, converting the delay-Doppler domain waveform to a time domain waveform, and transmitting the time domain waveform.

20 Claims, 16 Drawing Sheets

(51) Int. Cl.
  *H04L 5/00* (2006.01)
  *H04L 25/03* (2006.01)
(52) U.S. Cl.
  CPC ...... *H04L 5/0037* (2013.01); *H04L 25/03834* (2013.01); *H04L 27/2607* (2013.01)
(58) Field of Classification Search
  USPC ........................................................ 375/260
  See application file for complete search history.

(56) References Cited

U.S. PATENT DOCUMENTS

| | | | |
|---|---|---|---|
| 5,182,642 A | 1/1993 | Gersdorff et al. | |
| 5,623,511 A | 4/1997 | Bar-David et al. | |
| 5,831,977 A | 11/1998 | Dent | |
| 5,872,542 A | 2/1999 | Simons et al. | |
| 5,956,624 A | 9/1999 | Hunsinger et al. | |
| 6,212,246 B1 | 4/2001 | Hendrickson | |
| 6,289,063 B1 | 9/2001 | Duxbury | |
| 6,356,555 B1 | 3/2002 | Rakib et al. | |
| 6,388,621 B1 | 5/2002 | Lynch | |
| 6,426,983 B1 | 7/2002 | Rakib et al. | |
| 6,608,864 B1 | 8/2003 | Strait | |
| 6,631,168 B2 | 10/2003 | Izumi | |
| 6,704,366 B1 | 3/2004 | Cornbes et al. | |
| 6,956,814 B1 | 10/2005 | Campanella | |
| 7,010,048 B1 | 3/2006 | Shattil | |
| 7,327,812 B2 | 2/2008 | Auer | |
| 7,392,018 B1 | 6/2008 | Ebert et al. | |
| 7,689,049 B2 | 3/2010 | Monro | |
| 7,773,685 B2 | 8/2010 | Tirkkonen et al. | |
| 7,864,877 B2 | 1/2011 | Hottinen | |
| 8,229,017 B1 | 7/2012 | Lee et al. | |
| 8,259,845 B2 | 9/2012 | Dent | |
| 8,401,131 B2 | 3/2013 | Fety et al. | |
| 8,547,988 B2 | 10/2013 | Hadani et al. | |
| 8,619,892 B2 | 12/2013 | Vetter et al. | |
| 8,717,210 B2 | 5/2014 | Eldar et al. | |
| 8,879,378 B2 | 11/2014 | Rakib et al. | |
| 8,892,048 B1 | 11/2014 | Turner | |
| 8,976,851 B2 | 3/2015 | Hadani et al. | |
| 9,031,141 B2 | 5/2015 | Hadani et al. | |
| 9,071,285 B2 | 6/2015 | Hadani et al. | |
| 9,071,286 B2 | 6/2015 | Hadani et al. | |
| 9,083,483 B1 | 7/2015 | Rakib et al. | |
| 9,083,595 B2 | 7/2015 | Rakib et al. | |
| 9,130,638 B2 | 9/2015 | Hadani et al. | |
| 9,179,455 B2 * | 11/2015 | Park | H04W 72/02 |
| 9,282,528 B2 | 3/2016 | Hashimoto | |
| 9,294,315 B2 | 3/2016 | Hadani et al. | |
| 9,444,514 B2 | 9/2016 | Hadani et al. | |
| 9,548,840 B2 | 1/2017 | Hadani et al. | |
| 9,553,984 B2 | 1/2017 | Krause et al. | |
| 9,590,779 B2 | 3/2017 | Hadani et al. | |
| 9,634,719 B2 | 4/2017 | Rakib et al. | |
| 9,660,851 B2 | 5/2017 | Hadani et al. | |
| 9,668,148 B2 | 5/2017 | Hadani et al. | |
| 9,712,354 B2 | 7/2017 | Hadani et al. | |
| 9,729,281 B2 | 8/2017 | Hadani et al. | |
| 9,870,380 B2 * | 1/2018 | Qi | G06F 16/1737 |
| 10,028,025 B2 * | 7/2018 | Tidwell | H04N 21/44222 |
| 10,602,430 B2 * | 3/2020 | Chu | H04W 48/08 |
| 2001/0031022 A1 | 10/2001 | Petrus et al. | |
| 2001/0033614 A1 | 10/2001 | Hudson | |
| 2001/0046205 A1 | 11/2001 | Easton et al. | |
| 2002/0001308 A1 | 1/2002 | Heuer | |
| 2002/0034191 A1 | 3/2002 | Shattil | |
| 2002/0181388 A1 | 12/2002 | Jain et al. | |
| 2002/0181390 A1 | 12/2002 | Mody et al. | |
| 2002/0181607 A1 | 12/2002 | Izumi | |
| 2003/0073464 A1 | 4/2003 | Giannakis et al. | |
| 2003/0185295 A1 | 10/2003 | Yousef | |
| 2003/0235147 A1 | 12/2003 | Walton et al. | |
| 2004/0044715 A1 | 3/2004 | Aldroubi et al. | |
| 2004/0174812 A1 | 9/2004 | Murakami et al. | |
| 2004/0189581 A1 | 9/2004 | Sako et al. | |
| 2004/0218523 A1 | 11/2004 | Varshney et al. | |
| 2005/0157778 A1 | 7/2005 | Trachewsky et al. | |
| 2005/0157820 A1 | 7/2005 | Wongwirawat et al. | |
| 2005/0180517 A1 | 8/2005 | Abe | |
| 2005/0207334 A1 | 9/2005 | Hadad | |
| 2005/0251844 A1 | 11/2005 | Marione et al. | |
| 2006/0008021 A1 | 1/2006 | Bonnet | |
| 2006/0039270 A1 | 2/2006 | Strohmer et al. | |
| 2007/0014272 A1 | 1/2007 | Palanki et al. | |
| 2007/0038691 A1 | 2/2007 | Candes et al. | |
| 2007/0078661 A1 | 4/2007 | Sriram et al. | |
| 2007/0104283 A1 | 5/2007 | Han et al. | |
| 2007/0110131 A1 | 5/2007 | Guess et al. | |
| 2007/0211952 A1 | 9/2007 | Faber et al. | |
| 2007/0237181 A1 | 10/2007 | Cho et al. | |
| 2007/0253465 A1 | 11/2007 | Muharemovic et al. | |
| 2007/0253504 A1 | 11/2007 | Hasegawa | |
| 2008/0043857 A1 | 2/2008 | Dias et al. | |
| 2008/0117999 A1 | 5/2008 | Kadous et al. | |
| 2008/0122982 A1 * | 5/2008 | Lin | H04N 9/78 348/666 |
| 2008/0186843 A1 | 8/2008 | Ma et al. | |
| 2008/0187062 A1 | 8/2008 | Pan et al. | |
| 2008/0232504 A1 | 9/2008 | Ma et al. | |
| 2008/0310383 A1 | 12/2008 | Kowalski | |
| 2009/0080403 A1 | 3/2009 | Hamdi | |
| 2009/0092259 A1 | 4/2009 | Jot et al. | |
| 2009/0103593 A1 | 4/2009 | Bergamo | |
| 2009/0122854 A1 | 5/2009 | Zhu et al. | |
| 2009/0161804 A1 | 6/2009 | Chrabieh et al. | |
| 2009/0204627 A1 | 8/2009 | Hadani | |
| 2009/0222226 A1 | 9/2009 | Baraniuk et al. | |
| 2009/0303961 A1 | 12/2009 | Popovic et al. | |
| 2010/0001901 A1 | 1/2010 | Baraniuk et al. | |
| 2010/0008432 A1 | 1/2010 | Kim et al. | |
| 2010/0027608 A1 | 2/2010 | Priotti | |
| 2010/0111138 A1 | 5/2010 | Hosur et al. | |
| 2010/0142476 A1 | 6/2010 | Jiang et al. | |
| 2010/0187914 A1 | 7/2010 | Rada et al. | |
| 2010/0238787 A1 | 9/2010 | Guey | |
| 2010/0277308 A1 | 11/2010 | Potkonjak | |
| 2010/0303136 A1 | 12/2010 | Ashikhmin et al. | |
| 2010/0322349 A1 | 12/2010 | Lee et al. | |
| 2011/0007789 A1 | 1/2011 | Garmany | |
| 2011/0013716 A1 * | 1/2011 | Brodzik | H04J 13/10 375/295 |
| 2011/0110532 A1 | 5/2011 | Svendsen | |
| 2011/0116489 A1 | 5/2011 | Grandhi | |
| 2011/0116516 A1 | 5/2011 | Hwang et al. | |
| 2011/0126071 A1 | 5/2011 | Han et al. | |
| 2011/0131463 A1 | 6/2011 | Gunnam | |
| 2011/0216808 A1 | 9/2011 | Tong et al. | |
| 2011/0286502 A1 | 11/2011 | Adachi et al. | |
| 2011/0287778 A1 | 11/2011 | Levin et al. | |
| 2011/0292971 A1 | 12/2011 | Hadani et al. | |
| 2011/0293030 A1 | 12/2011 | Rakib et al. | |
| 2011/0299379 A1 | 12/2011 | Sesia et al. | |
| 2011/0305267 A1 | 12/2011 | Riu et al. | |
| 2012/0021769 A1 | 1/2012 | Lindoff et al. | |
| 2012/0051457 A1 | 3/2012 | Ma et al. | |
| 2012/0140716 A1 | 6/2012 | Baldemair et al. | |
| 2012/0170684 A1 | 7/2012 | Yim et al. | |
| 2012/0201322 A1 | 8/2012 | Rakib et al. | |
| 2012/0213098 A1 | 8/2012 | Sun | |
| 2012/0235795 A1 | 9/2012 | Liao et al. | |
| 2012/0269201 A1 | 10/2012 | Atungsiri et al. | |
| 2012/0272117 A1 | 10/2012 | Stadelmeier et al. | |
| 2012/0320994 A1 | 12/2012 | Loghin et al. | |
| 2013/0021977 A1 | 1/2013 | Yang et al. | |
| 2013/0058390 A1 | 3/2013 | Haas et al. | |
| 2013/0077579 A1 | 3/2013 | Cho et al. | |
| 2013/0083661 A1 | 4/2013 | Gupta et al. | |
| 2013/0121497 A1 | 5/2013 | Smaragdis et al. | |
| 2013/0230010 A1 | 9/2013 | Kim et al. | |
| 2013/0260787 A1 | 10/2013 | Hashimoto | |
| 2013/0279627 A1 | 10/2013 | Wu et al. | |
| 2013/0315133 A1 | 11/2013 | Wang et al. | |
| 2014/0143639 A1 | 5/2014 | Loghin et al. | |

(56) References Cited

U.S. PATENT DOCUMENTS

| | | |
|---|---|---|
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0307824 A1* | 10/2014 | Shen .................... H04L 5/0048 375/267 |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017/011478 A1 | 1/2017 |
| WO | 2017003952 | 1/2017 |
| WO | 2017011478 | 1/2017 |
| WO | 2017/049303 A1 | 3/2017 |

OTHER PUBLICATIONS

Yunlong Cai et al: "Modulation and Multiple Access for 5G Networks", Cornell University Library, Feb. 21, 2017, 31 pages.
Office Action for U.S. Appl. No. 13/117,119, dated Aug. 5, 2013, 5 pages.
Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.

(56) References Cited

OTHER PUBLICATIONS

Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. URL: http://www.att.com/Investor/ATT_Annual/2014/att_introduces_new_concepts_for_telecom_network.html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 in: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], dated Mar. 11, 2011 Retrieved on Mar 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

* cited by examiner

DIGITAL COMMUNICATION USING LATTICE DIVISION MULTIPLEXING

CROSS-REFERENCE TO RELATED APPLICATIONS

This patent document is a 371 National Phase Application of PCT Application No. PCT/US2018/029209 entitled "DIGITAL COMMUNICATION USING LATTICE DIVISION MULTIPLEXING" filed on Apr. 24, 2018 which claims priority to and benefits of U.S. Provisional Patent Application No. 62/489,401 entitled "DIGITAL COMMUNICATION USING LATTICE DIVISION MULTIPLEXING" filed on Apr. 24, 2017. The entire contents of the aforementioned patent applications are incorporated by reference as part of the disclosure of this patent document.

TECHNICAL FIELD

The present document relates to wireless communication, and more particularly, to data modulations schemes used in wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques that can be used to implement transmitters and receivers for communicating using a modulation technique called lattice division multiplexing.

In one example aspect, wireless communication method, implementable by a wireless communication apparatus is disclosed. The method includes encoding information bits as a periodic sequence of quadrature amplitude modulation (QAM) symbols, convolving the periodic sequence with a periodic pulse function, thereby generating a filtered periodic sequence, transforming the filtered periodic sequence to a delay-Doppler domain waveform, converting the delay-Doppler domain waveform to a time domain waveform, and transmitting the time domain waveform.

In another aspect, a wireless communication method that includes transforming an information signal to a discrete lattice domain signal, shaping bandwidth and duration of the discrete lattice domain signal by a two-dimensional filtering procedure to generate a filtered information signal, generating a time domain signal from the filtered information signal, and transmitting the time domain signal over a wireless communication channel is disclosed.

In another example aspect, a wireless communication apparatus that implements the above-described methods is disclosed.

In yet another example aspect, the method may be embodied as processor-executable code and may be stored on a computer-readable program medium.

These, and other, features are described in this document.

BRIEF DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion of techniques or the embodiments to the respective sections only.

Traditional multi-carrier (MC) transmissions schemes such as orthogonal frequency division multiplexing (OFDM) schemes are characterized by two parameters: symbol period (or repetition rate) and subcarrier spacing. The symbols include a cyclic prefix (CP), whose size typically depends on the delay of the wireless channel for which the OFDM modulation scheme is being used. In other words, CP size is often fixed based on channel delay and if symbols are shrunk to increase system rate, it simply results in the CP becoming a greater and greater overhead. Furthermore, closely placed subcarriers can cause inter-carrier interference and thus OFDM systems have a practical limit on how close the subcarriers can be placed to each other without causing unacceptable level of interference, which makes it harder for a receiver to successfully receive the transmitted data.

The theoretical framework disclosed in the present document, including Appendix A and Appendix B, can be used to build signal transmission and reception equipment that can overcome the above discussed problems, among others.

This patent document discloses, among other techniques, a lattice division multiplexing technique that, in some embodiments, can be used to implement embodiments that can perform multi-carrier digital communication without having to rely on CP.

For the sake of illustration, many embodiments disclosed herein are described with reference to the Zak transform. However, one of skill in the art will understand that other transforms with similar mathematical properties may also be used by implementations. For example, such transforms may include transforms that can be represented as an infinite series in which each term is a product of a dilation of a translation by an integer of the function and an exponential function.

Figure 1:
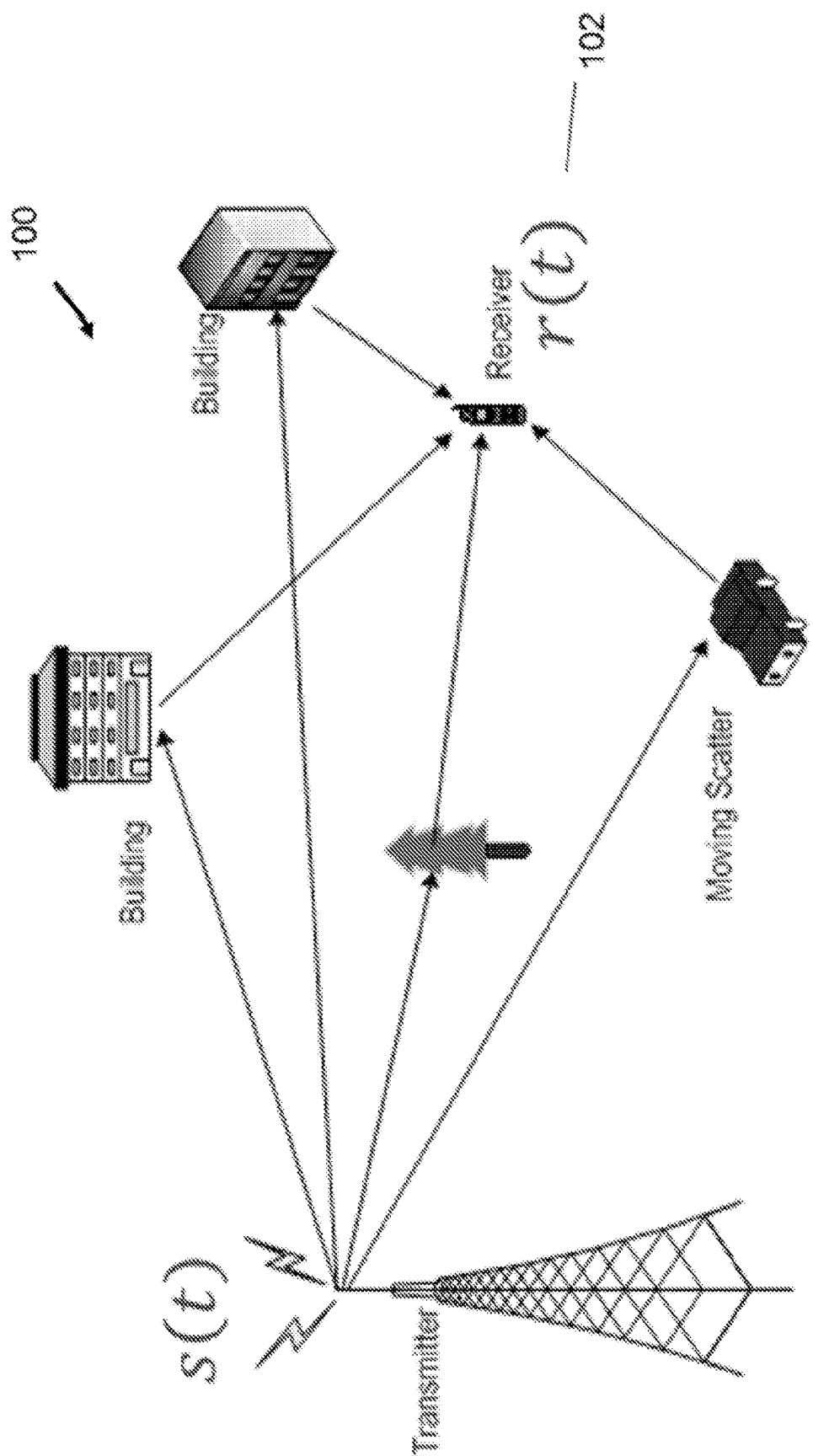
FIG. 1 shows an example of a wireless communication system.

FIG. 1 shows an example communication network 100 in which the disclosed technologies can be implemented. The network 100 may include a base station transmitter that transmits wireless signals s(t) (e.g., downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102 or at the transmitter (e.g., a base station).

Signal transmissions in a wireless network may be represented by describing the waveforms in the time domain, in the frequency domain, or in the delay-Doppler domain (e.g., Zak domain). Because these three represent three different ways of describing the signals, signal in one domain can be converted into signal in the other domain via a transform. For example, a time-Zak transform may be used to convert from Zak domain to time domain. For example, a frequency-Zak transform may be used to convert from the Zak domain to the frequency domain. For example, the Fourier transform (or its inverse) may be used to convert between the time and frequency domains.

Figure 2:
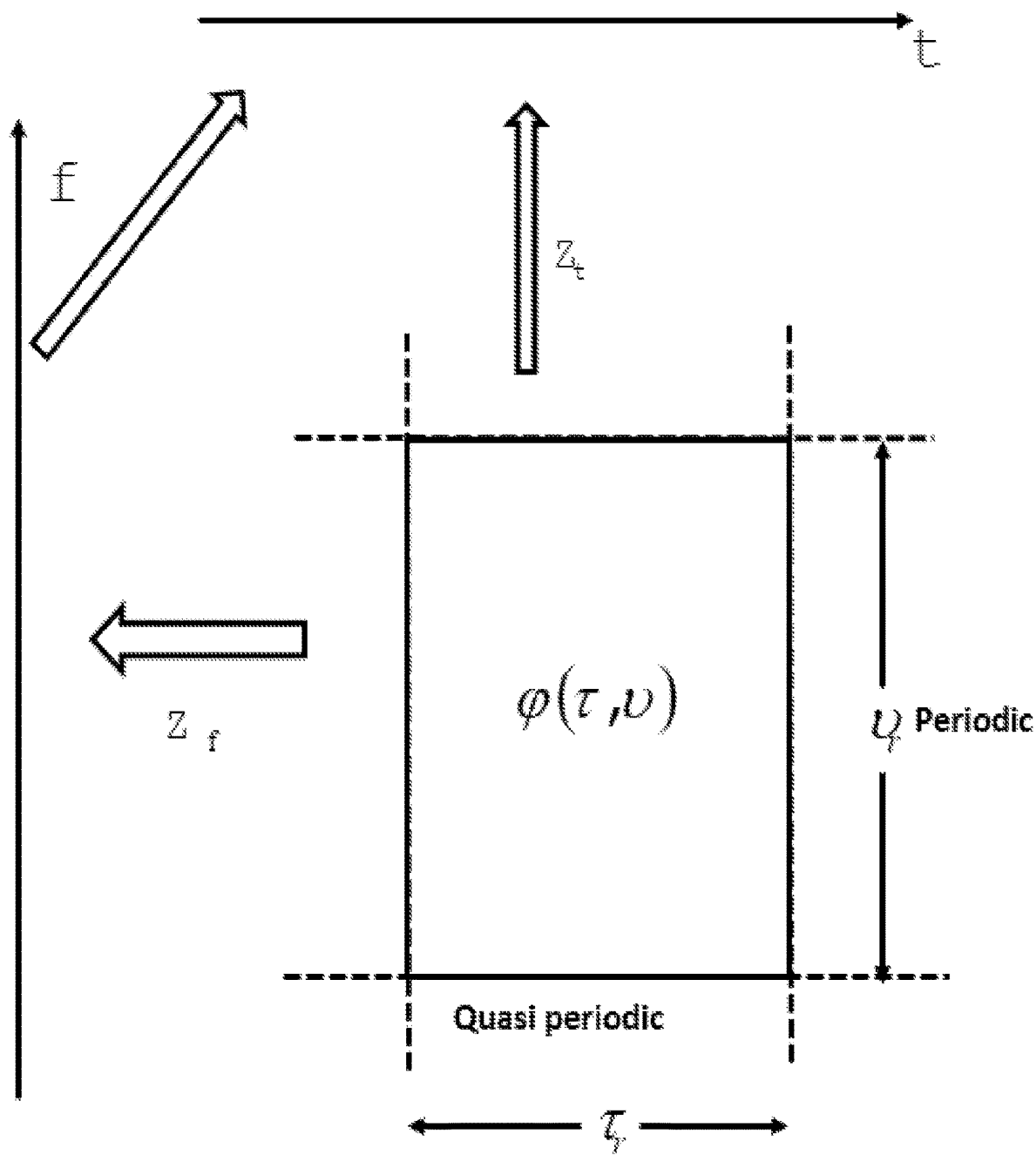
FIG. 2 pictorially depicts relationship between time, frequency and Zak domains.

FIG. 2 shows the relationships among the various domains. The horizontal axis represents time, the vertical axis represents frequency and signal in the Zak domain is shown as a 2-D shape in the ($\tau$, $v$), or delay-Doppler domain.

A Zak waveform could be represented as a function of two variables—delay ($\tau$) and Doppler ($v$). As disclosed later on in this document, a Zak waveform is periodic along the Doppler variable and quasi-periodic (up to a phase term) in the delay variable.

Figure 3:
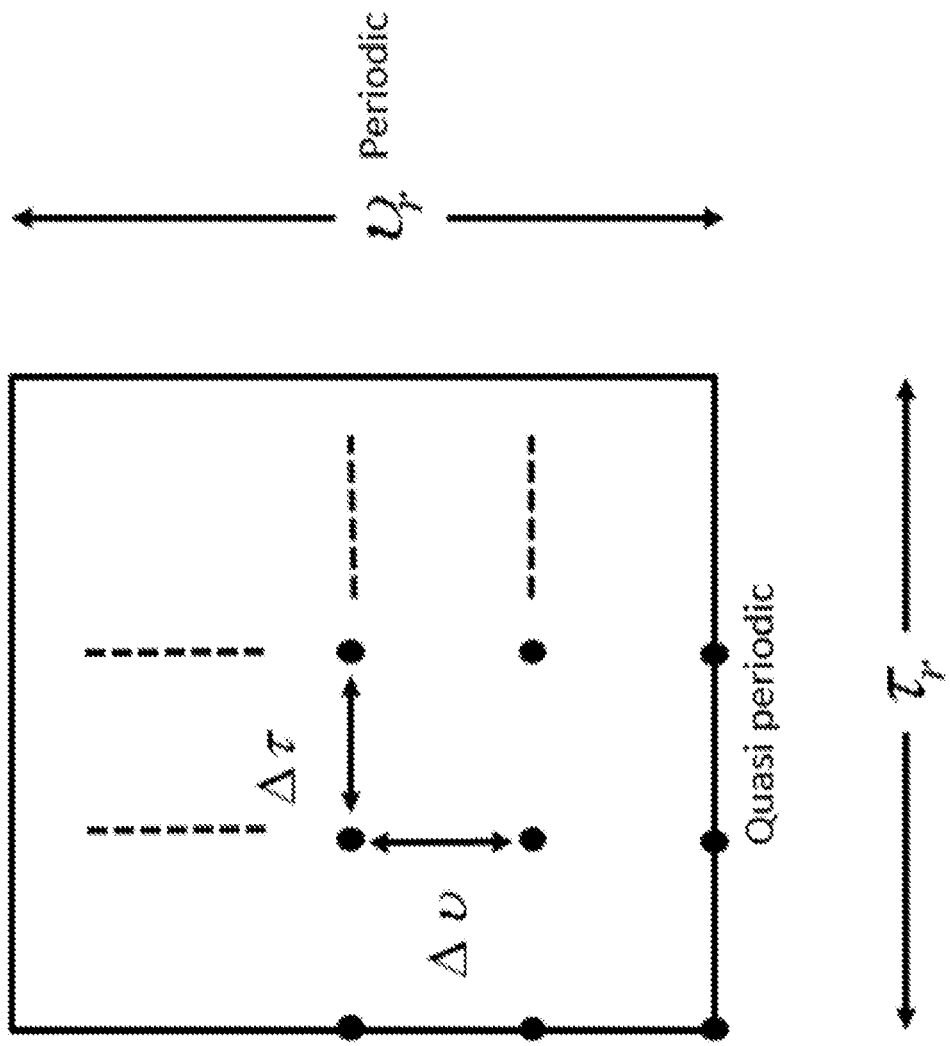
FIG. 3 pictorially depicts the periodic and quasi-periodic nature of an information grid in the Zak domain.

FIG. 3 pictorially depicts the periodic nature of a Zak waveform in the two dimensions delay ($\tau$) and Doppler ($v$), where each solid circle represents a QAM symbol based on the data being carried in the Zak waveform.

Figure 4:
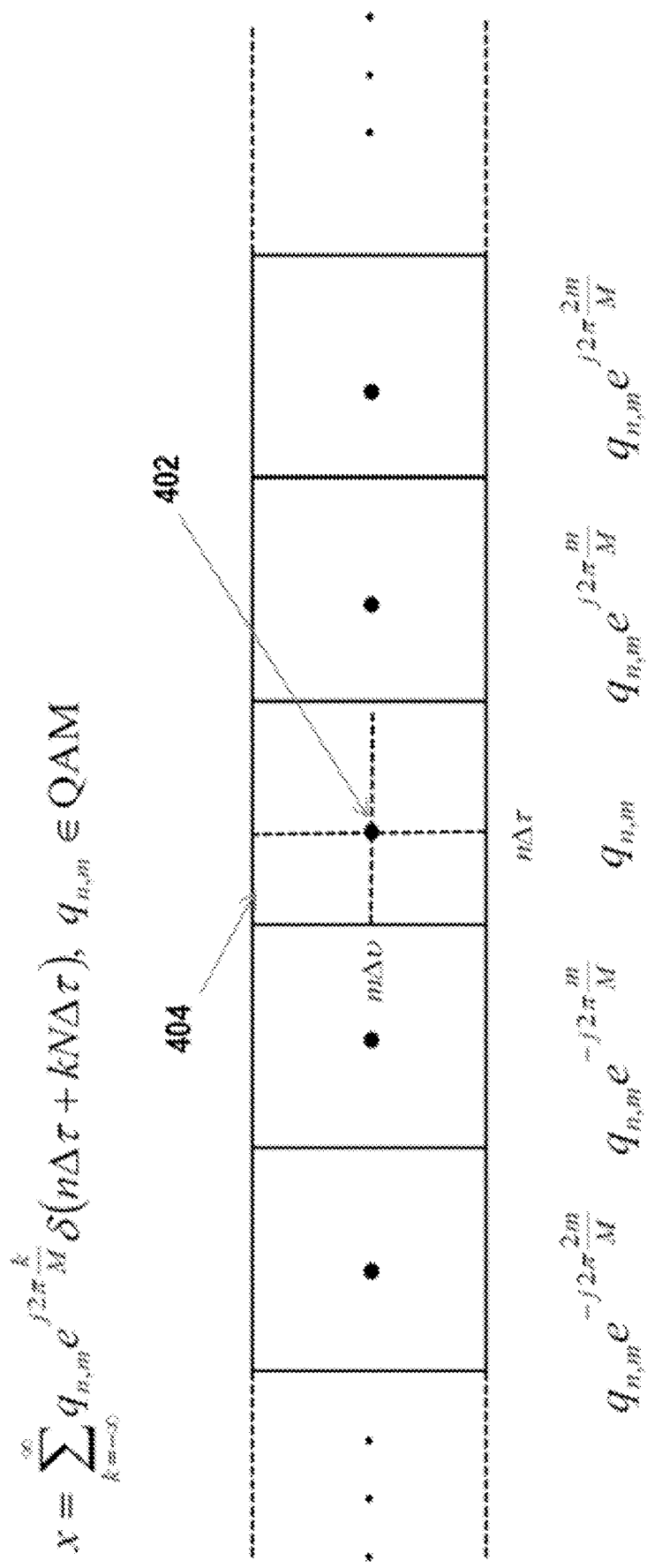
FIG. 4 pictorially depicts the transformation of a single Quadrature Amplitude Modulation (QAM) symbol.

FIG. 4 depicts a lattice domain representation of a QAM symbol 402. The lattice domain is a transform domain representation using two dimensions represented by two independent vectors (e.g., delay and Doppler or time-frequency). While not explicitly shown for the sake of clarity, it is understood that the QAM symbol will mathematically occur periodically in the vertical dimension in FIG. 4. Furthermore, while also not shown for the sake of clarity, during operation, multiple QAM symbols will be mapped in the rectangle 404. Additionally, the QAM symbol is quasi-periodic in the horizontal direction (representing time), and the corresponding phases in each instance are shown by the equations below the graph.

Figure 5:
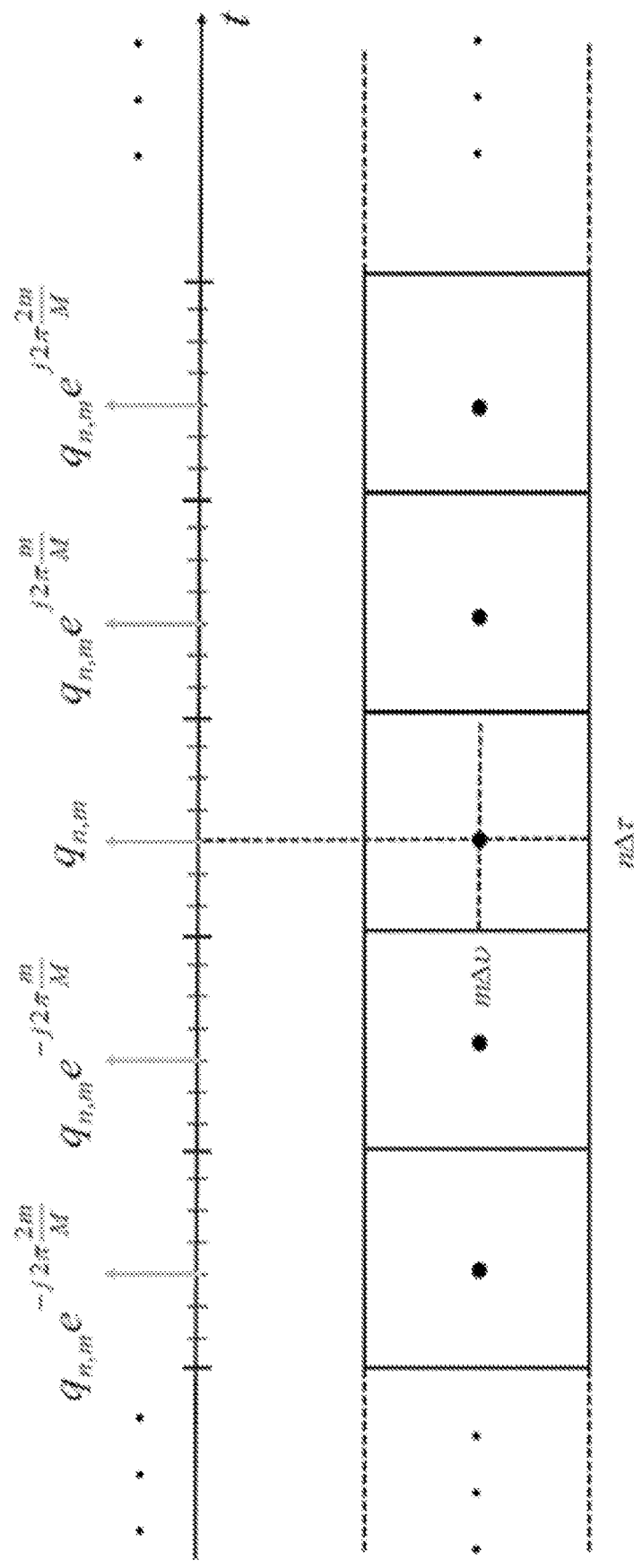
FIG. 5 pictorially depicts periodicity of a QAM symbol.

FIG. 5 graphically shows the effect of integration along the $v$ dimension. For example, as shown by the equation 502:

$$Z(x) = \int_0^{v_\tau} x(\tau, v)\,dv$$

Z(x) represents the Zak domain to time transform, representing integration along the Doppler domain $v$.

Figure 6:
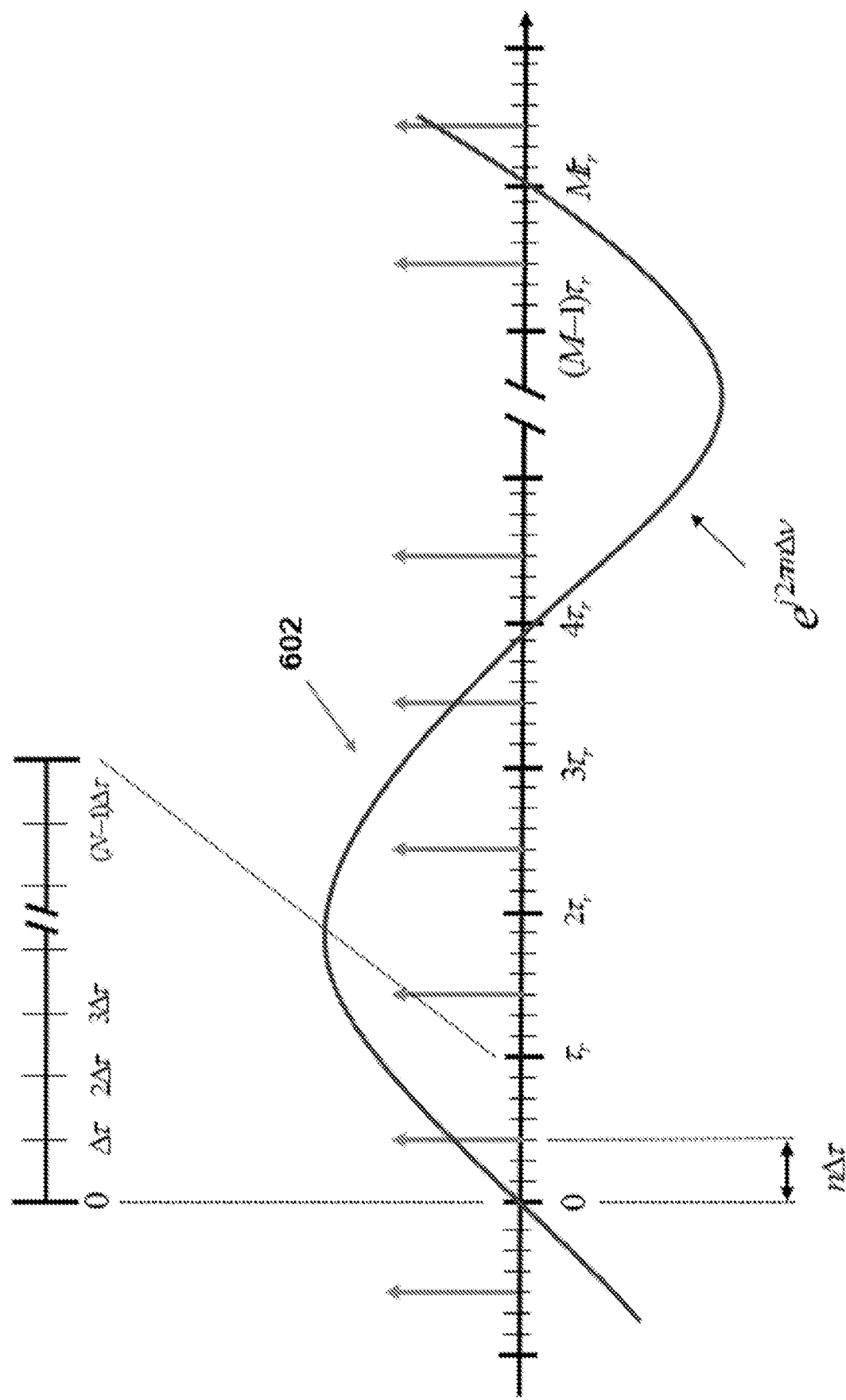
FIG. 6 is a graphical representation of an OTFS waveform.

FIG. 6 is a graphical representation of an Orthogonal Time Frequency Space (OTFS) waveform 602 plotted along the delay dimension (horizontal) and Doppler dimension (vertical axis).

Figure 7:
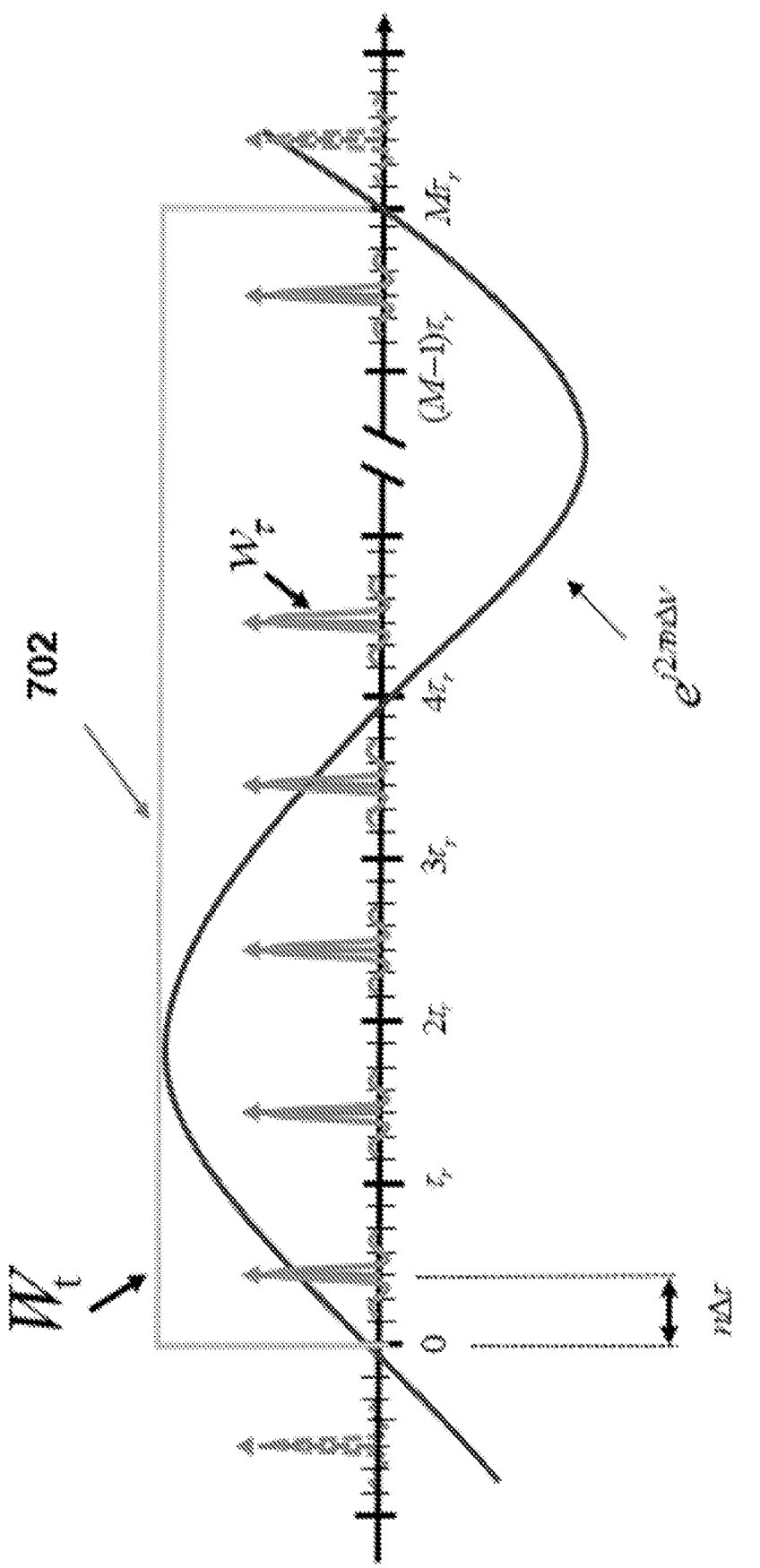
FIG. 7 is a graphical representation of a windowing function.

FIG. 7 is a graphical representation of a windowing function 702 using same coordinate systems as in FIG. 6. The windowing function 702 operates along time and is depicted along the delay dimension and stretches over one period of the OTFS waveform 602.

Figure 8:
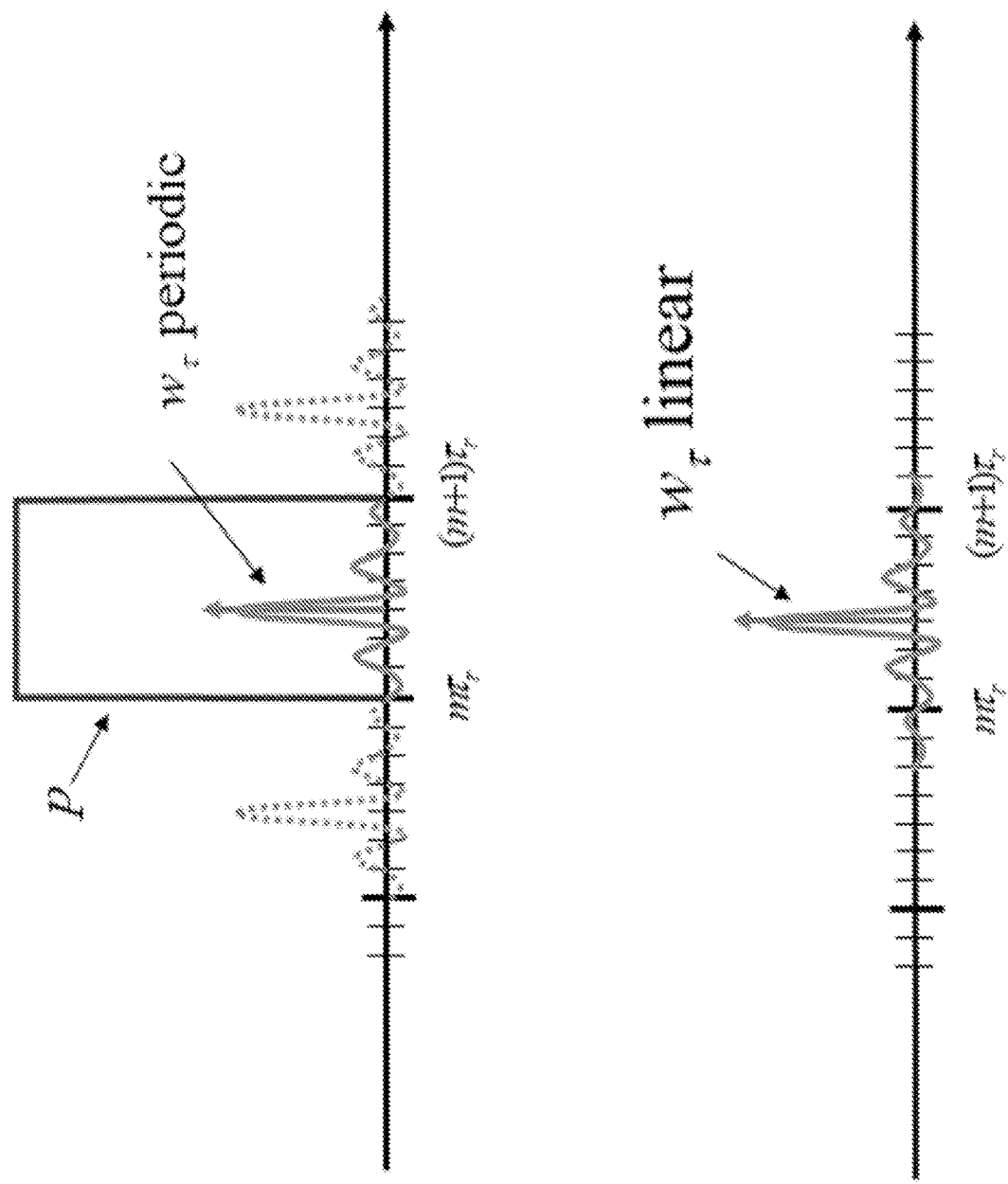
FIG. 8 is a graphical comparison of transmit waveforms of a single QAM symbol using OTFS and OTFS-MC (multicarrier).

FIG. 8 is a graphical comparison of transmit waveforms of a single QAM symbol using OTFS and OTFS-MC (multicarrier).

Figure 9:
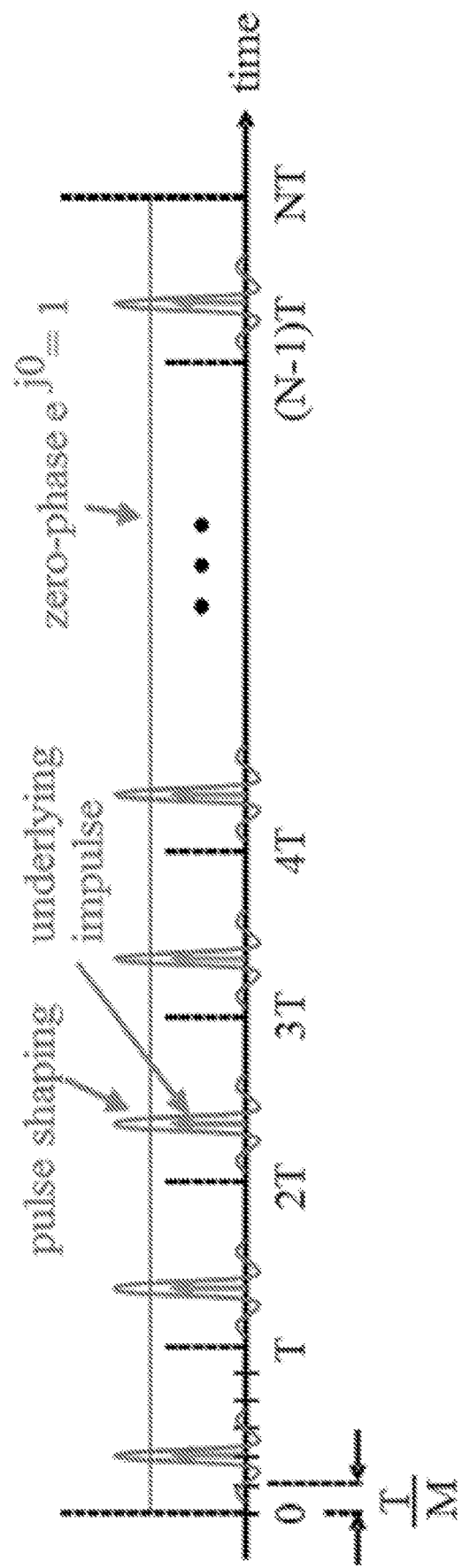
FIG. 9 shows a combined waveform for multiple symbols.

FIG. 9 shows a combined waveform for multiple symbols, depicting underlying impulses and shaped pulses, as further explained herein.

Figure 10:
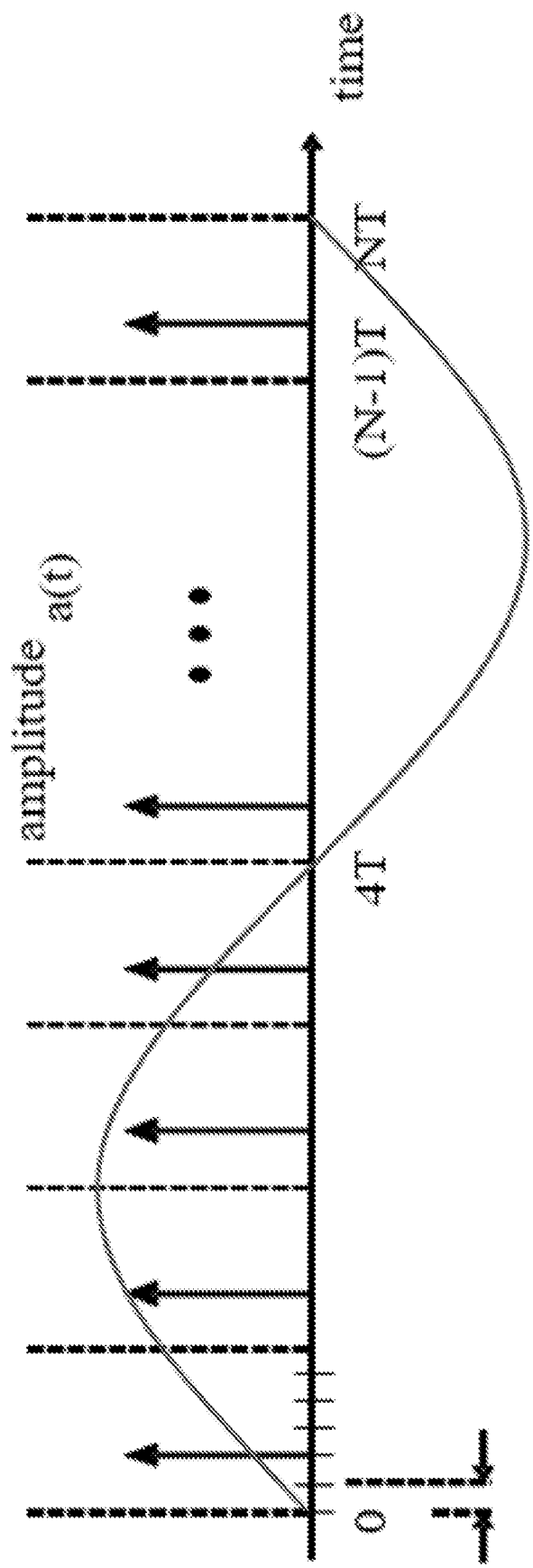
FIG. 10 shows a waveform of modulated QAM signals.

FIG. 10 shows a waveform of modulated QAM symbols along time (horizontal axis) direction.

The sections numbered "A" and "B" below provide additional mathematical properties and practical uses of the signal waveforms and graphs depicted in FIGS. 5 to 10.

A0. Introduction to OTFS Modulation from Zak Theoretic Point

Next few sections explain the OTFS modulation from the Zak theoretic point of view. This line of exposition push to the forefront the independent status of OTFS as a novel modulation technique and reveals its unique mathematical attributes. This, in contrast to the alternative approach of presenting OTFS as a preprocessing step over MC modulation which somehow obscures the true nature of OTFS and also sacrifice some of its unique strengths. We focus our attention on the following core theoretical topics:

(1) Heisenberg theory.
(2) Zak theory.
(3) OTFS modulation.
(4) Symplectic Fourier duality relation between OTFS and Multi Carrier modulations which is a particular case of the general relation between Radar theory and communication theory.

Before proceeding into a detailed development, it is beneficial to give a brief outline. In signal processing, it is traditional to represent signals (or waveforms) either in time or in the frequency domain. Each representation reveals different attributes of the signal. The dictionary between these two realizations is the Fourier transform:

$$FT: L_2(t \in \mathbb{R}) \to L_2(f \in \mathbb{R}), \qquad (0.1)$$

Interestingly, there is another domain where signals can be naturally realized. This domain is called the delay Doppler domain. For the purpose of the present discussion, this is also referred to as the Zak domain. In its simplest form, a Zak signal is a function $\varphi(\tau,\nu)$ of two variables. The variable $\tau$ is called delay and the variable $\nu$ is called Doppler. The function $\varphi(\tau,\nu)$ is assumed to be periodic along $\nu$ with period $\nu_r$ and quasi-periodic along $\tau$ with period $\tau_r$. The quasi periodicity condition is given by:

$$\varphi(\tau+n\tau_r,+m\nu_r)=\exp(j2\pi n\nu\cdot\tau_r)\varphi(\tau,\nu), \qquad (0.2)$$

for every n, $m \in \mathbb{Z}$. The periods are assumed to satisfy the Nyquist condition $\tau_r \cdot \nu_r = 1$. Zak domain signals are related to time and frequency domain signals through canonical transforms $Z_t$ and $Z_f$ called the time and frequency Zak transforms. In more precise terms, denoting the Hilbert space of Zak signals by $H_z$, the time and frequency Zak transforms are linear transformations:

$$Z_t : H_z \rightarrow L_2(t \in \mathbb{R}), \qquad (0.3)$$

$$Z_f : H_z \rightarrow L_2(f \in \mathbb{R}). \qquad (0.4)$$

The pair $Z_t$ and $Z_f$ establishes a factorization of the Fourier transform $FT = Z_f \cdot [Z_t]^{-1}$. This factorization is sometimes referred to as the Zak factorization. The Zak factorization embodies the combinatorics of the fast Fourier transform algorithm. The precise formulas for the Zak transforms will be given in the sequel. At this point it is enough to say that they are principally geometric projections: the time Zak transform is integration along the Doppler variable and reciprocally the frequency Zak transform is integration along the delay variable. The different signal domains and the transformations connecting between them are depicted in FIG. 2.

We next proceed to give the outline of the OTFS modulation. The key thing to note is that the Zak transform plays for OTFS the same role the Fourier transform plays for OFDM. More specifically, in OTFS, the information bits are encoded on the delay Doppler domain as a Zak signal $x(\tau,\nu)$ and transmitted through the rule:

$$OTFS(x) = Z_t(w *_\sigma x(\tau,\nu)), \qquad (0.5)$$

where $w *_\sigma x(\tau,\nu)$ stands for two-dimensional filtering operation with a 2D pulse $w(\tau,\nu)$ using an operation $*_\sigma$ called twisted convolution (to be explained in the present document). The conversion to the physical time domain is done using the Zak transform. Formula (0.5) should be contrasted with the analogue formulas in case of frequency division multiple access FDMA and time division multiple access TDMA. In FDMA, the information bits are encoded on the frequency domain as a signal $x(f)$ and transmitted through the rule:

$$FDMA(x) = FT(w(f)*x(f)), \qquad (0.6)$$

where the filtering is done on the frequency domain by linear convolution with a 1D pulse $w(f)$ (in case of standard OFDM $w(f)$ is equal an sinc function). The modulation mapping is the Fourier transform. In TDMA, the information bits are encoded on the time domain as a signal $x(t)$ and transmitted through the rule:

$$TDMA(x) = Id(w(t)*x(t)), \qquad (0.7)$$

where the filtering is done on the time domain by linear convolution with a 1D pulse $w(t)$. The modulation mapping in this case is identity.

A1. Heisenberg Theory

In this section we introduce the Heisenberg group and the associated Heisenberg representation. These constitute the fundamental structures of signal processing. In a nutshell, signal processing can be cast as the study of various realizations of signals under Heisenberg operations of delay and phase modulation.

A1.1 The Delay Doppler plane. The most fundamental structure is the delay Doppler plane $V = \mathbb{R}^2$ equipped with the standard symplectic form:

$$\omega(\nu_1,\nu_2) = \nu_1\tau_2 - \tau_1\nu_2, \qquad (1.1)$$

for every $\nu_1 = (\tau_1, \nu_1)$ and $\nu_2 = (\tau_2, \nu_2)$. Another way to express $\omega$ is to arrange the vectors $\nu_1$ and $\nu_2$ as the columns of a 2×2 matrix so that $\omega(\nu_1,\nu_2)$ is equal the additive inverse of the matrix determinant.

$$\omega(\nu_1, \nu_2) = -\det\begin{bmatrix} | & | \\ \nu_1 & \nu_2 \\ | & | \end{bmatrix}.$$

The symplectic form is anti-symmetric $\omega(\nu_1, \nu_2) = -\omega(\nu_2, \nu_1)$, thus, in particular $\omega(\nu,\nu) = 0$ for every $\nu \in V$. We also consider the polarization form:

$$\beta(\nu_1,\nu_2) = \nu_1\tau_2, \qquad (1.2)$$

for every $\nu_1 = (\tau_1,\nu_1)$ and $\nu_2 = (\tau_2, \nu_2)$. We have that:

$$\beta(\nu_1,\nu_2) - \beta(\nu_2,\nu_1) = \omega(\nu_1,\nu_2), \qquad (1.3)$$

The form $\beta$ should be thought of as "half" of the symplectic form. Finally, we denote by $\psi(z) = \exp(2\pi i z)$ is the standard one-dimensional Fourier exponent.

A1.2 The Heisenberg group. The polarization form $\beta$ gives rise to a two step unipotent group called the Heisenberg group. As a set, the Heisenberg group is realized as Heis = $V \times S^1$ where the multiplication rule is given by:

$$(\nu_1,z_1)\cdot(\nu_2,z_2) = (\nu_1+\nu_2, \exp(j2\pi\beta(\nu_1,\nu_2))z_1 z_2). \qquad (1.4)$$

One can verify that indeed rule (1.4) yields a group structure: it is associative, the element (0, 1) acts as unit and the inverse of the element $(\nu, z)$ is given by:

$$(\nu,z)^{-1} = (-\nu, \exp(j2\pi\beta(\nu,\nu))z^{-1})$$

Most importantly, the Heisenberg group is not commutative. In general, $(\nu_1, z_1)(\nu_2, z_2) \neq (\nu_2, z_2)\cdot(\nu_1, z_1)$. The center consists of all elements of the form $(0,z)$, $z \in S^1$. The multiplication rule gives rise to a group convolution operation between functions:

$$h_1 *_\sigma h_2(\nu) = \int_{\nu_1+\nu_2=\nu} \exp(j2\pi\beta(\nu_1, \nu_2)) h_1(\nu_1) h_2(\nu_2) \qquad (1.5)$$

$$= \int_{\nu'} \exp(j2\pi\beta(\nu', \nu-\nu')) h_1(\nu') h_2(\nu-\nu') d\nu',$$

for every pair of functions $h_1, h_2 \in \mathbb{C}(V)$. We refer to (1.5) as Heisenberg convolution or twisted convolution. We note that a twisted convolution differs from linear convolution through the additional phase factor $\exp(j2\pi\beta(\nu_1,\nu_2))$.

A1.3 The Heisenberg representation The representation theory of the Heisenberg group is relatively simple. In a nutshell, fixing the action of the center, there is a unique (up-to isomorphism) irreducible representation. This uniqueness is referred to as the Stone-von Neumann property. The precise statement is summarized in the following theorem: Theorem 1.1 (Stone-von-Neumann Theorem). There is a unique (up to isomorphism) irreducible Unitary representation $\pi$: Heis$\rightarrow$U(H) such that $\pi(0,z) = z Id_H$.

In concrete terms, the Heisenberg representation is a collection of unitary operators $\pi(v) \in U(H)$, for every $v \in V$ satisfying the multiplicativity relation:

$$\pi(v_1) \cdot \pi(v_2) = \exp(j2\pi\beta(v_1, v_2))\pi(v_1 + v_2), \quad (1.6)$$

for every $v_1, v_2 \in V$. In other words, the relations between the various operators in the family are encoded in the structure of the Heisenberg group. An equivalent way to view the Heisenberg representation is as a linear transform $\Pi: \mathbb{C}(V) \to Op(H)$, taking a function $h \in \mathbb{C}(V)$ and sending it to the operator $\Pi(h) \in Op(H)$ given by:

$$\Pi(h) = \int_{v \in V} h(v) dv, \quad (1.7)$$

The multiplicativity relation (1.6) translates to the fact that H interchanges between Heisenberg convolution of functions and composition of linear transformations, i.e., $$\Pi(h_1 *_\sigma h_2) = \Pi(h_1) \cdot \Pi(h_2), \quad (1.8)$$

for every $h_1, h_2 \in \mathbb{C}(V)$. Interestingly, the representation $\pi$, although is unique, admits multitude of realizations. Particularly well known are the time and frequency realizations, both defined on the Hilbert space of complex valued functions on the real line $H = L_2(\mathbb{R})$. For every $x \in \mathbb{R}$, we define two basic unitary transforms:

$$L_x(\varphi)(y) = \varphi(y - x), \quad (1.9)$$

$$M_x(\varphi)(y) = \exp(j2\pi x y)\varphi(y). \quad (1.10)$$

for every $\varphi \in H$. The transform $L_x$ is called delay by x and the transform $M_x$ is called modulation by x. Given a point $v = (\tau, V) \in V$ we define the time realization of the Heisenberg representation by:

$$\pi_t(v) \triangleright \varphi = L_\tau \cdot M_v(\varphi). \quad (1.11)$$

where we use the notation $\triangleright$ to designate the application of an operator on a vector. It is usual in this context to denote the basic coordinate function by t (time). Under this convention, the right-hand side of (1.11) takes the explicit form $\exp(j2\pi v(t - \tau))\varphi(t - \tau)$. Reciprocally, we define the frequency realization of the Heisenberg representation by:

$$\pi_f(v) \triangleright \varphi = M_{-\tau} \cdot L_v(\varphi). \quad (1.12)$$

In this context, it is accustom to denote the basic coordinate function by f (frequency). Under this convention, the right-hand side of (1.12) takes the explicit form $\exp(-j2\pi\tau f)\varphi(f - v)$. By Theorem 1.1, the time and frequency realizations are isomorphic in the sense that there is an intertwining transform translating between the time and frequency Heisenberg actions. The intertwining transform in this case is the Fourier transform:

$$FT(\varphi)(f) = \int_t \exp(-j2\pi f t)\varphi(t) dt, \quad (1.13)$$

for every $\varphi \in H$. The time and frequency Heisenberg operators $\pi_t(v, z)$ and $\pi_f(v, z)$ are interchanged via the Fourier transform in the sense that:

$$FT \cdot \pi_t(v) = \pi_f(v) \cdot FT, \quad (1.14)$$

for every $v \in V$. We stress that from the point of view of representation theory the characteristic property of the Fourier transform is the interchanging equation (1.14).

A2. Zak Theory

In this section we describe the Zak realization of the signal space. A Zak realization depends on a choice of a parameter. This parameter is a critically sampled lattice in the delay Doppler plane. Hence, first we devote some time to get some familiarity with the basic theory of lattices. For simplicity, we focus our attention on rectangular lattices. The extension of the theory to non-rectangular lattices (called Heisenberg lattices) appears in the more comprehensive manuscript.

A2.1 Delay Doppler Lattices.

A delay Doppler lattice is an integral span of a pair of linear independent vectors $g_1, g_2 \in V$. In more details, given such a pair, the associated lattice is the set:

$$\Lambda = \{a_1 g_1 + a_2 g_2 : a_1, a_2 \in \mathbb{Z}\}. \quad (2.1)$$

The vectors $g_1$ and $g_2$ are called the lattice basis vectors. It is convenient to arrange the basis vectors as the first and second columns of a matrix G, i.e.:

$$G = \begin{bmatrix} | & | \\ g_1 & g_2 \\ | & | \end{bmatrix}, \quad (2.2)$$

referred to as the basis matrix. In this way the lattice $\Lambda = G(\mathbb{Z}^2)$, that is, the image of the standard lattice under the matrix G. The volume of the lattice is by definition the area of the fundamental domain which is equal to the absolute value of the determinant of G. Every lattice admits a symplectic reciprocal lattice, aka orthogonal complement lattice that we denote by $\Lambda^\perp$. The definition of $\Lambda^\perp$ is:

$$\Lambda^\perp = \{v \in V : \omega(v, \lambda) \in \mathbb{Z} \text{ for every } \lambda \in \Lambda\}. \quad (2.3)$$

We say that $\Lambda$ is under-sampled if $\Lambda \subset \Lambda^\perp$. We say that $\Lambda$ is critically sampled if $\Lambda = \Lambda^\perp$. Alternatively, an under-sampled lattice is such that the volume of its fundamental domain is $\geq 1$. From this point on we consider only under-sampled lattices. Given a lattice $\Lambda$, we define its maximal rectangular sub-lattice as $\Lambda_r = \mathbb{Z} \tau_r \oplus \mathbb{Z} v_r$ where:

$$\tau_r = \arg\min \{\tau > 0 : (\tau, 0) \in \Lambda\}, \quad (2.4)$$

$$v_r = \arg\min \{v > 0 : (0, v) \in \Lambda\}. \quad (2.5)$$

When either $\tau_r$ or $v_r$ are infinite, we define $\Lambda_r = \{0\}$. We say a lattice $\Lambda$ is rectangular if $\Lambda = \Lambda_r$. Evidently, a sub-lattice of a rectangular lattice is also rectangular. A rectangular lattice is under-sampled if $\tau_r v_r \geq 1$. The standard example of a critically sampled rectangular lattice is $\Lambda_{rec} = \mathbb{Z} \oplus \mathbb{Z}$, generated by the unit matrix:

$$G_{rec} = \begin{bmatrix} 1 & 0 \\ 0 & 1 \end{bmatrix}. \quad (2.6)$$

Figure 14:
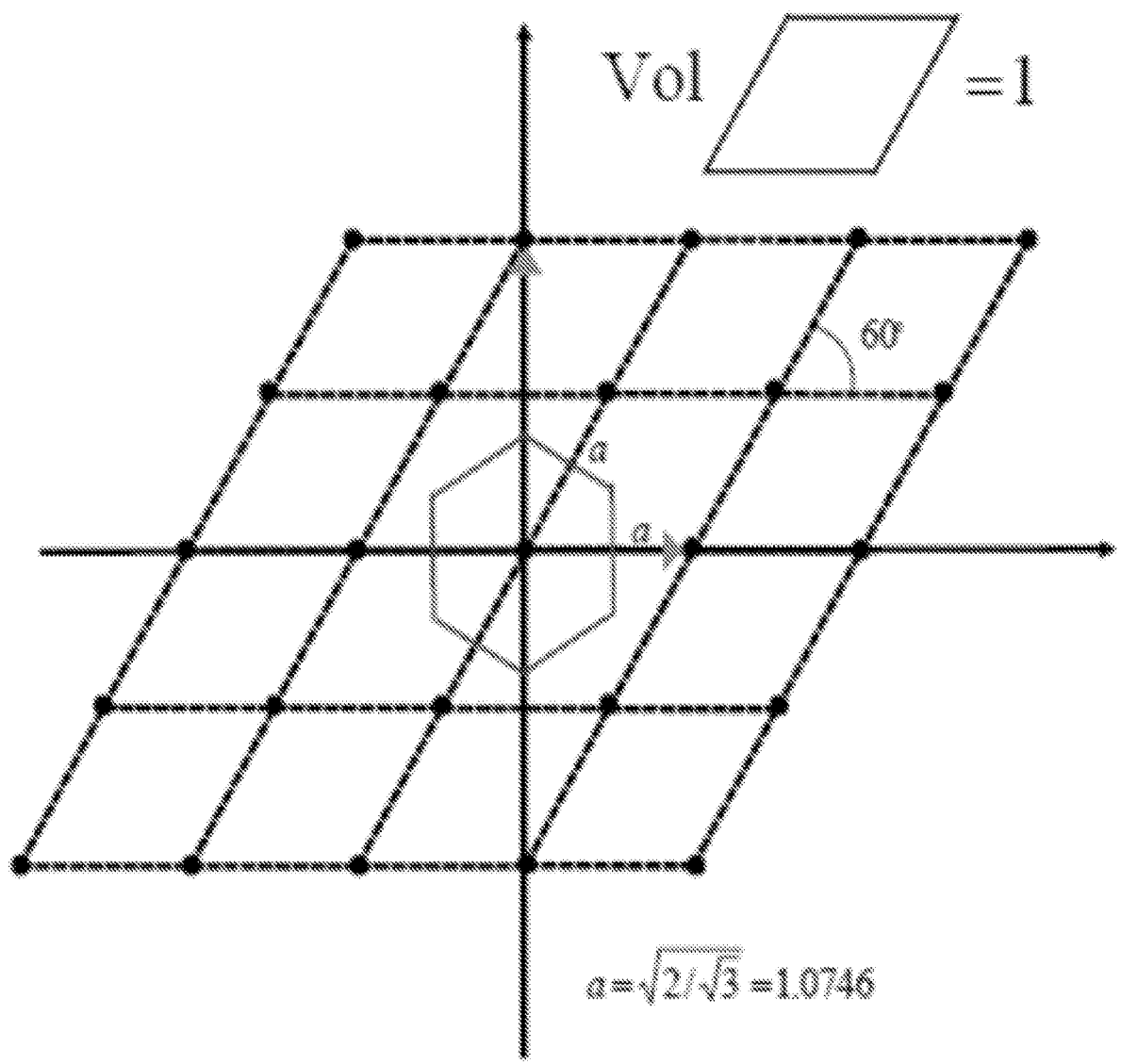
FIG. 14 shows an example of a hexagonal lattice. The hexagon at the center region encloses Voronoi region around the zero lattice point. The two lattice points with arrow decoration are the basis of the maximal rectangular sub-lattice.

An important example of critically sampled lattice that is not rectangular is the hexagonal lattice $\Lambda_{hex}$, see FIG. 14, generated by the basis matrix:

$$G_{hex} = \begin{bmatrix} a & a/2 \\ 0 & a^{-1} \end{bmatrix}, \quad (2.7)$$

where $\alpha = \sqrt{2\sqrt{3}}$ The interesting attribute of the hexagonal lattice is that among all critically sampled lattices it has the longest distance between neighboring points. The maximal rectangular sub-lattice of $\Lambda_{hex}$ is generated by $g_1$ and $2g_2 - g_1$, see the two lattice points decorated with arrow heads in FIG. 14. From this point on we consider only rectangular lattices.

A2.2 Zak waveforms A Zak realization is parametrized by a choice of a critically sampled lattice:

$$\Lambda = \mathbb{Z}(\tau_r, 0) \oplus \mathbb{Z}(0, \nu_r) \quad (2.8)$$

where $\tau_r \cdot \nu_r = 1$. The signals in a Zak realization are called Zak signals. Fixing the lattice $\Lambda$, a Zak signal is a function $\varphi: V \to \mathbb{C}$ that satisfies the following quasi periodicity condition:

$$\varphi(\nu + \lambda) = \exp(j2\beta(\nu,\lambda))\varphi(\nu), \quad (2.9)$$

for every $\nu \in V$ and $\lambda \in \Lambda$. Writing $\lambda = (k\tau_r, l\nu_r)$, condition (2.9) takes the concrete form:

$$\varphi(\tau + k\tau_r, l\nu_r) = \exp(j2\pi\nu k\tau_r)\varphi(\tau,\nu), \quad (2.10)$$

that is to say that $\varphi$ is periodic function along the Doppler dimension with period $\nu_r$ and quasi-periodic function along the delay dimension with quasi period $\tau_r$. In conclusion, we denote the Hilbert space of Zak signals by $H_z$.

A2.3 Heisenberg action The Hilbert space of Zak signals supports a realization of the Heisenberg representation. Given an element $u \in V$, the corresponding Heisenberg operator $\pi_z(U)$ is given by: (2.11) $\{\pi_z(u) \triangleright \varphi\}(\nu) = \exp(j2\pi\beta(u,\nu-u))\varphi(\nu-u)$, for every $\varphi \in H_z$. In words, the element u acts through two-dimensional shift in combination with modulation by a linear phase. The Heisenberg action simplifies in case the element u belongs to the lattice. A direct computation reveals that in this case the action of $u = \lambda \in \Lambda$ takes the form:

$$\{\pi_z(\lambda) \triangleright \varphi\}(\nu) = \exp(j2\pi\omega(\lambda,\nu))\varphi(\nu), \quad (2.12)$$

In words, the operator $\pi_z(\lambda)$ is multiplication with the symplectic Fourier exponent associated with the point $\lambda$. Consequently, the extended action of an impulse function $h \in \mathbb{C}(V)$ is given by:

$$\{\Pi_z(h) \triangleright \varphi\}(\nu) = \int_{u \in V} h(u)\{\pi_z(u) \triangleright \varphi\}(\nu)du \quad (2.13)$$

$$= \int_{u \in V} \psi(j2\pi\beta(u, \nu - u))h(u)\varphi(\nu - u)du,$$

for every $\varphi \in H_z$. In fact, $\Pi_z(h) \triangleright \varphi = h *_\sigma \varphi$, that is to say that the extended action is given by twisted convolution of the impulse h with the waveform $\varphi$.

A2.4 Zak transforms There are canonical intertwining transforms converting between Zak signals and time/frequency signals, referred to in the literature as the time/frequency Zak transforms. We denote them by:

$$Z_t: H_z \to L_2(t \in \mathbb{R}), \quad (2.14)$$

$$Z_f: H_z \to L_2(f \in \mathbb{R}), \quad (2.15)$$

As it turns out, the time/frequency Zak transforms are basically geometric projections along the reciprocal dimensions, see FIG. 2. The formulas of the transforms are as follows:

$$Z_t(\varphi)(t) = \int_0^{\nu_r} \varphi(t,\nu)d\nu, \quad (2.16)$$

$$Z_f(\varphi)(f) = \int_0^{\tau_r} \exp(-j2\pi f\tau)\varphi(\tau,f)d\tau, \quad (2.17)$$

for every $\varphi \in H_z$. In words, the time Zak transform is integration along the Doppler dimension (taking the DC component) for every point of time. Reciprocally, the frequency Zak transform is Fourier transform along the delay dimension. The formulas of the inverse transforms are as follows:

$$Z_t^{-1}(\varphi)(\tau, \nu) = \sum_{n \in \mathbb{Z}} \exp(-j2\pi\nu\tau_r n)\varphi(\tau + n\tau_r), \quad (2.18)$$

$$Z_f^{-1}(\varphi)(\tau, \nu) = \sum_{n \in \mathbb{Z}} \exp(j2\pi\tau(\nu_r n + \nu))\varphi(\nu + n\nu_r), \quad (2.19)$$

for every $\varphi \in L_2(\mathbb{R})$. From this point on we will focus only on the time Zak transform and we will denote it by $Z = Z_t$. As an intertwining transform Z interchanges between the two Heisenberg operators $\pi_z(\nu, z)$ and $\pi_t(\nu, z)$, i.e.:

$$Z \cdot \pi_z(\nu) = \pi_t(\nu) \cdot Z, \quad (2.20)$$

for every $\nu \in V$. From the point of view of representation theory the characteristic property of the Zak transform is the interchanging equation (2.20).

A2.5 Standard Zak signal Our goal is to describe the Zak representation of the window function:

$$p(t) = \begin{cases} 1 & 0 \le t < \tau_r \\ 0 & \text{otherwise} \end{cases}, \quad (2.21)$$

This function is typically used as the generator waveform in multi-carrier modulations (without CP). A direct application of formula (2.18) reveals that $P = Z^{-1}(p)$ is given by:

$$P(\tau, \nu) = \sum_{n \in \mathbb{Z}} \psi(\nu n \tau_r) p(\tau - n\tau_r), \quad (2.22)$$

One can show that $P(a\tau_r, b\nu_r) = 1$ for every a, $b \in [0,1)$, which means that it is of constant modulo 1 with phase given by a regular step function along $\tau$ with constant step given by the Doppler coordinate $\nu$. Note the discontinuity of P as it jumps in phase at every integer point along delay. This phase discontinuity is the Zak domain manifestation of the discontinuity of the rectangular window p at the boundaries.

A3. OTFS

The OTFS transceiver structure depends on the choice of the following parameters: a critically sampled lattice $\Lambda = \mathbb{Z}(\tau_r, 0) \oplus \mathbb{Z}(0, \nu_r)$, a filter function $w \in C(V)$ and an information grid specified by N, M$\in \mathbb{N}$. We assume that the filter function factorizes as $w(\tau,\nu) = w_t(\tau)w_\nu(\nu)$ where the delay and Doppler factors are square root Nyquist with respect to $\Delta\tau = \tau_r/N$ and $\Delta\nu = \nu_r/M$ respectively. We encode the information bits as a periodic 2D sequence of QAM symbols $x = x[n\Delta\tau, m\Delta\nu]$ with periods (N,M). Multiplying x by the standard Zak signal P we obtain a Zak signal x P. A concrete way to think of x P is as the unique quasi periodic extension of the finite sequence $x[n\Delta\tau, m\Delta\nu]$ where n=0, ..., N−1 and m=0, ..., M−1. We define the modulated transmit waveform as:

$$M(x) = Z(\Pi_z(w) *_\sigma x \cdot P) \quad (3.1)$$

$$= Z(w *_\sigma x \cdot P),$$

To summarize: the modulation rule proceeds in three steps. In the first step the information block x is quasi-periodized thus transformed into a discrete Zak signal. In the second step, the bandwidth and duration of the signal are shaped through a 2D filtering procedure defined by twisted convolution with the pulse w. In the third step, the filtered signal is transformed to the time domain through application of the Zak transform. To better understand the structure of the transmit waveform we apply few simple algebraic manipulations to (3.1). First, we note that, being an intertwiner (Formula (2.20)), the Zak transform obeys the relation:

$$Z(\pi_z(w)*_\sigma x \cdot p) = \Pi_t(w) \triangleright Z(x \cdot P), \quad (3.2)$$

Second, we note that the factorization $w(\tau,\nu)=w_\tau(\tau)w_\nu(\nu)$ can be expressed as twisted convolution $w=w_\tau *_\sigma w_\nu$. Hence, we can write:

$$\Pi_t(w) \triangleright Z(x \cdot P) = \Pi_t(w_\tau *_\sigma w_\nu) \triangleright Z(x \cdot P) \quad (3.3)$$
$$= \Pi_t(w_\tau) \triangleright \{\Pi_t(w_\nu) \triangleright Z(x \cdot P)\}$$
$$= w_\tau * \{W_t \cdot Z(x \cdot P)\},$$

where $W_t = FT^{-1}(w_\nu)$ and * stands for linear convolution in time. We refer to the waveform $Z(x \cdot P)$ as the bare OTFS waveform. We see from Formula (3.3) that the transmit waveform is obtained from the bare waveform through windowing in time followed by convolution with a pulse. This cascade of operations is the time representation of 2D filtering in the Zak domain. It is beneficial to study the structure of the bare OTFS waveform in the case x is supported on a single grid point (aka consists of a single QAM symbol), i.e., $x=\delta(n\Delta\tau,m\Delta\nu)$. In this case, one can show that the bare waveform takes the form:

$$Z(x \cdot P) = \sum_K \exp(j2\pi m(K+n/N)/M)\delta(K\tau_r + n\Delta\tau), \quad (3.4)$$

In words, the bare waveform is a shifted and phase modulated infinite delta pulse train of pulse rate $\nu_r=\tau_r^{-1}$ where the shift is determined by the delay parameter n and the modulation is determined by the Doppler parameter m. Bare and filtered OTFS waveforms corresponding to a single QAM symbol are depicted in FIG. 6 and FIG. 7 respectively. We next proceed to describe the de-modulation mapping. Given a received waveform $\varphi_{rx}$, its de-modulated image $y=D(\varphi_{rx})$ is defined through the rule:

$$D(\varphi_{rx}) = w^{\star} *_\sigma Z^{-1}(\varphi_{rx}), \quad (3.5)$$

where $w^\star$ is the matched filter given by $w^\star(\nu)=\exp(-j2\pi\beta(\nu,\nu))\overline{w(-\nu)}$. We often incorporate an additional step of sampling y at $(n\Delta\tau,m\Delta\nu)$ for $n=0,\ldots,N-1$ and $m=0,\ldots,M-1$.

A3.1 OTFS channel model The OTFS channel model is the explicit relation between the input variable x and the output variable y in the presence of a channel H. We assume the channel transformation is defined as $H=\Pi_t(h)$ where $h=h(\tau,\nu)$ is the delay Doppler impulse response. This means that given a transmit waveform $\varphi_{tx}$, the received waveform $\varphi_{rx}=H(\varphi_{tx})$ is given by:

$$\varphi_{rx}(t) = \int_{\tau,\nu} h(\tau,\nu)\exp(j2\pi\nu(t-\tau))\varphi_{tx}(t)d\tau d\nu, \quad (3.6)$$

If we take the transmit waveform to be $\varphi_{tx}=M(x)$ then direct computation reveals that:

$$y = D \circ H \circ M(x) \quad (3.7)$$
$$= w^\star *_\sigma Z^{-1}(\Pi_t(h) \triangleright Z(w *_\sigma x \cdot P))$$
$$= w^\star *_\sigma h *_\sigma Z^{-1} \circ Z(w *_\sigma x \cdot P)$$
$$= w^\star *_\sigma h *_\sigma w *_\sigma x \cdot P,$$

If we denote $h_w = w^{\star*}\circ h*_\sigma w$ then we can write the input-output relation in the form:

$$y = h_w *_\sigma x \cdot P, \quad (3.8)$$

The delay Doppler impulse $h_w$ represents the filtered channel that interacts with the QAM symbols when those are modulated and de-modulated through the OTFS transceiver cycle. One can show that under some mild assumptions $h_w$ is well approximated by $h*w^{(2)}$ where * stands for linear convolution and $w^{(2)}=w^{\star}*w$ is the linear auto-correlation function. In case the channel is trivial, that is $h=\delta(0,0)$, we get that k, $=w^{\star}*_\sigma w \sim w^{(2)}$, thus after sampling we get (an approximate) perfect reconstruction relation:

$$y[n\Delta\tau,m\Delta\nu] \sim x[n\Delta\tau,m\Delta\nu], \quad (3.9)$$

for every $n=0,\ldots,N-1$ and $m=0,\ldots,M-1$.

A4. Symplectic Fourier Duality

In this section we describe a variant of the OTFS modulation that can be expressed by means of symplectic Fourier duality as a pre-processing step over critically sampled MC modulation. We refer to this variant as OTFS-MC. For the sake of concreteness, we develop explicit formulas only for the case of OFDM without a CP.

A4.1 Symplectic Fourier transform We denote by $L_2(V)$ the Hilbert space of square integrable functions on the vector space V. For every $\nu \in V$ we define the symplectic exponential (wave function) parametrized by $\nu$ as the function $\psi_\nu: V \to \mathbb{C}$ given by:

$$\psi_\nu(u) = \exp(j2\pi\omega(\nu,u)), \quad (4.1)$$

for every $u \in V$. Concretely, if $\nu=(\tau,\nu)$ and $u=(\tau',\nu')$ then $\psi_\nu(u)=\exp(j2\pi(\nu\tau'-\tau\nu'))$. Using symplectic exponents we define the symplectic Fourier transform as the unitary transformation $SF: L_2(V) \to L_2(V)$ given by:

$$SF(g)(\nu) = \int_{\nu'} \overline{\psi_\nu(\nu')} g(\nu')d\nu' \quad (4.2)$$
$$= \int_{\nu'} \exp(-j2\pi\omega(\nu,\nu'))g(\nu')d\nu',$$

The symplectic Fourier transform satisfies various interesting properties (much in analogy with the standard Euclidean Fourier transform). The symplectic Fourier transform converts between linear convolution and multiplication of functions, that is:

$$SF(g_1 * g_2) = SF(g_1) \cdot SF(g_2), \quad (4.3)$$

for every $g_1,g_2 \in L_2(V)$. Given a lattice $\Lambda \subset V$, the symplectic Fourier transform maps sampled functions on $\Lambda$ to periodic function with respect to the symplectic reciprocal lattice $\Lambda^\perp$. That is, if g is sampled and $G=SF(g)$ then $G(\nu+\lambda^\perp)=G(\nu)$ for every $\nu \in V$ and $\lambda^\perp \in \Lambda^\perp$. This relation takes a simpler form in case $\Lambda$ is critically sampled since $\Lambda^\perp=\Lambda$. Finally, unlike its Euclidean counterpart, the symplectic Fourier transform is equal to its inverse, that is $SF=SF^{-1}$.

A4.2 OTFS-MC The main point of departure is the definition of the filtering pulse w and the way it applies to the QAM symbols. To define the MC filtering pulse we consider sampled window function W: $\Lambda \to \mathbb{C}$ on the lattice $\Lambda = \mathbb{Z}\,\tau_r \oplus \mathbb{Z}\,\nu_r$. We define w to be the symplectic Fourier dual to W:

$$w = SF(W), \tag{4.4}$$

By definition, w is a periodic function on V satisfying $w(\nu+\lambda)=w(\nu)$ for every $\nu \in V$ and $\lambda \in \Lambda$. Typically, W is taken to be a square window with 0/1 values spanning over a certain bandwidth $B = M \cdot \nu_r$ and duration $T = N \cdot \tau_r$. In such a case, w will turn to be a Dirichlet sinc function that is Nyquist with respect to the grid $\Lambda_{N,M} = \mathbb{Z}\,\Delta\tau \oplus \mathbb{Z}\,\Delta\nu$, where:

$$\Delta\tau = \tau_r/N, \tag{4.5}$$

$$\Delta\nu = \nu_r/M, \tag{4.6}$$

More sophisticated windows designs can include tapering along the boundaries and also include pseudo-random scrambling phase values. As before, the bits are encoded as a 2D periodic sequence of QAM symbols $x = x[n\Delta\tau, m\Delta\nu]$ with period (N, M). The transmit waveform is defined through the rule:

$$M_{MC}(x) = Z((w*x) \cdot P), \tag{4.7}$$

In words, the OTFS-MC modulation proceeds in three steps. First step, the periodic sequence is filtered by means of periodic convolution with the periodic pulse w. Second step, the filtered function is converted to a Zak signal by multiplication with the Zak signal P. Third step, the Zak signal is converted into the physical time domain by means of the Zak transform. We stress the differences from Formula (3.1) where the sequence is first multiplied by P and then filtered by twisted convolution with a non-periodic pulse. The point is that unlike (3.1), Formula (4.7) is related through symplectic Fourier duality to MC modulation. To see this, we first note that $w*x = SF(W \cdot X)$ where $X = SF(x)$. This means that we can write:

$$(w*x) \cdot P = \sum_{\lambda \in \Lambda} W(\lambda)X(\lambda)\psi_\lambda \cdot P \tag{4.8}$$

$$= \sum_{\lambda \in \Lambda} W(\lambda)X(\lambda)\pi_z(\lambda) \triangleright P,$$

where the first equality is by definition of the Symplectic Fourier transform and the second equality is by Formula (2.12). We denote $X_W = W \cdot X$ Having established this relation we can develop (4.7) into the form:

$$M_{MC}(x) = Z\left(\sum_{\lambda \in \Lambda} X_W(\lambda)\pi_z(\lambda) \triangleright P\right) \tag{4.9}$$

$$= \sum_{\lambda \in \Lambda} X_W(\lambda)Z(\pi_z(\lambda) \triangleright P)$$

$$= \sum_{\lambda \in \Lambda} X_W(\lambda)\pi_t(\lambda) \triangleright Z(P)$$

$$= \sum_{\lambda \in \Lambda} X_W(\lambda)\pi_t(\lambda) \triangleright p,$$

where the third equality is the intertwining property of the Zak transform and the forth equality is by definition $p = Z(P)$. In case of OFDM without CP, the pulse p is given by the square window along the interval $[0, \tau_r]$. Consequently, the last expression in (4.9) can be written explicitly as:

$$M_{MC}(x) = \sum_{k,l} X_W(k\tau_r, l\nu_r)\pi_t(k\tau_r, l\nu_r) \triangleright 1_{[0,\tau_r]} \tag{4.10}$$

$$= \sum_{k,l} X_W(k\tau_r, l\nu_r)L_{k\tau_r}M_{l\nu_r} \triangleright 1_{[0,\tau_r]}$$

$$= \sum_{k,l} X_W(k\tau_r, l\nu_r)\exp(j2\pi l\nu_r(t-k\tau_r))1_{[k\tau_r,(k+1)\tau_r]},$$

The reader can recognize the last expression of (4.10) as MC modulation of the (windowed) sequence of Fourier coefficients Xw. It is interesting to compare the transmit waveforms of OTFS and OTFS-MC corresponding to single QAM symbols. The two structures are depicted in FIG. 8. The main structural difference is the presence of discontinuities at the grid points $\mathbb{Z}\,\tau_r$ in the case of OTFS-MC.

B0. Introduction to OTFS Transceiver Operations from Realization Theory Perspective In the subsequent sections, we introduce yet another mathematical interpretation of the OTFS transceiver from the point of view of realization theory. In a nutshell, in this approach one considers the signal space of waveforms as a representation space of the Heisenberg group or equivalently as a Hilbert space equipped with collection of Heisenberg operators, each associated with a different point in the delay Doppler plane. This representation space admits multitude of realizations. The two standard ones are the time and frequency realizations and they are related through the one-dimensional Fourier transform. In communication theory the TDMA transceiver structure is naturally adapted to the time realization as QAM symbols are multiplexed along the time coordinate while the OFDM transceiver structure is naturally adapted to the frequency realization as the QAM symbols are multiplexed along the frequency coordinate. The main observation is that, there is a canonical realization lying in between the time and frequency realizations, called the Zak realization. Interestingly, waveforms in Zak realization are represented as functions on a two-dimensional delay Doppler domain satisfying certain quasi-periodicity condition. The main message of this note is that the Zak realization is naturally adapted to the OTFS transceiver. Viewing the OTFS transceiver from this perspective extenuates its novel and independent standing among the other existing transceiver structures. For convenience, we summarize in the following table the main formulas presented in this note:

| (0.1) | |
|---|---|
| QP | $\varphi(\nu + \lambda) = \psi(\beta(\nu,\lambda))\pi_\epsilon(\lambda)^{-1} \triangleright \varphi(\nu)$ |
| Z-Heis | $\pi^\epsilon(\nu_0) \triangleright \varphi(\nu) = \psi(-\beta(\nu_0,\nu_0))\psi(\beta(\nu_0,\nu))\varphi(\nu - \nu_0)$ |
| Z-Heis (lattice) | $\pi^\epsilon(\lambda, \epsilon(\lambda)) \triangleright \varphi(\nu) = \psi(\omega(\lambda,\nu))\varphi(\nu)$ |
| Zak to time | $Z_{time,\epsilon}(\varphi)(t) = \int_0^{\nu_r} \varphi(t,\nu)d\nu$ |
| time to Zak | $Z_{\epsilon,time}(\varphi)(t,\nu) = \sum_n \psi(-\nu\tau,n)f(\tau + n\tau_r)$ |
| Zak to freq | $Z_{freq,\epsilon}(\varphi)(f) = \int_0^{\tau_r} \psi(-f\tau)\varphi(\tau,f)d\tau$ |
| freq to Zak | $Z_{\epsilon,freq}(\varphi)(\tau, \nu) = \psi(\tau\nu)\sum_n \psi(\tau\nu,n)\varphi(f + n\nu_r)$ |
| N-Zak to Zak | $Z_{\epsilon,\epsilon'}(\varphi)(\tau, \nu) = \varphi_0(\tau, \nu)$ |
| Zak to N-Zak | $Z_{\epsilon',\epsilon}(\varphi)_i(\tau,\nu) = \psi(-\nu \cdot i/N)\varphi(\tau + i/N,\nu)$ |
| Z-std window | $P_{std}(\tau,\nu) = \sum_n \psi(\nu\tau,n)1_{[n,n+1]}(\tau/\tau_r)$ | where the Q abbreviate Quasi and Z abbreviate Zak.

B1. Mathematical preliminaries

B1.1 The Delay Doppler plane Let $V=\mathbb{R}^2$ be the delay Doppler plane equipped with the standard symplectic bilinear form $\omega: V \times V \to \mathbb{R}$ given by:

$$\omega(v_1, v_2) = v_1 \tau_2 - \tau_1 v_2, \quad (1.1)$$

for every $v_1 = (\tau_1, v_1)$ and $v_2 = (\tau_2, v_2)$. Another way to express w is to arrange the vectors $v_1$ and $v_2$ as the columns of a 2×2 matrix. The symplectic pairing $\omega(v_1, v_2)$ is equal the additive inverse of the determinant of this matrix, i.e.:

$$\omega(v_1, v_2) = -\det \begin{bmatrix} | & | \\ v_1 & v_2 \\ | & | \end{bmatrix},$$

We note that the symplectic form is anti-symmetric, i.e., $\omega(v_1, v_2) = -\omega(v_2, v_1)$ thus, in particular $\omega(v, v) = 0$ for every $v \in V$. In addition, we consider the polarization form $\beta: V \times V \to \mathbb{R}$ given by:

$$\beta(v_1, v_2) = v_1 \tau_2, \quad (1.2)$$

for every $v_1 = (\tau_1, v_1)$ and $v_2 = (\tau_2, v_2)$. We have that:

$$\beta(v_1, v_2) - \beta(v_2, v_1) = \omega(v_0, v_2), \quad (1.3)$$

The form $\beta$ should be thought of as "half" of the symplectic form. Finally, we denote by $\psi(z) = \exp(2\pi i z)$ is the standard one-dimensional Fourier exponent.

B1.2 Delay Doppler Lattices Refer to Section A2.1 above.

B1.3 The Heisenberg group The polarization form $\beta: V \times V \to \mathbb{R}$ gives rise to a two-step unipotent group called the Heisenberg group. As a set, the Heisenberg group is realized as Heis=$V \times S^1$ where the multiplication rule is given by:

$$(v_1, z_1) \cdot (v_2, z_2) = (v_1 + v_2, \psi(\beta(v_1, v_2)) z_1 z_2), \quad (1.11)$$

One can verify that indeed the rule (1.11) induces a group structure, i.e., it is associative, the element (0, 1) acts as unit and the inverse of (v,z) is $(-v, \psi(\beta(v,v))z^{-1})$. We note that the Heisenberg group is not commutative, i.e., $\tilde{v}_1 \cdot \tilde{v}_2$ is not necessarily equal to $\tilde{v}_2 \cdot \tilde{v}_1$. The center of the group consists of all elements of the form (0,z), $z \in S^1$. The multiplication rule gives rise to a group convolution operation between functions:

$$f_1 \circledast f_2(\tilde{v}) = \int_{\tilde{v}_1 \cdot \tilde{v}_2 = \tilde{v}} f_1(\tilde{v}_1) f_2(\tilde{v}_2), \quad (1.12)$$

for every pair of functions $f_1, f_2 \in \mathbb{C}$(Heis). We refer to the convolution operation $\circledast$ as Heisenberg convolution or twisted convolution.

The Heisenberg group admits multitude of finite subquotient groups. Each such group is associated with a choice of a pair $(\Lambda, \epsilon)$ where $\Lambda V$ is an under-sampled lattice and $\epsilon: \Lambda \to S^1$ is a map satisfying the following condition:

$$\epsilon(\lambda_1 + \lambda_2) = \epsilon(\lambda_1) \epsilon(\lambda_2) \psi(\beta(\lambda_1, \lambda_2)), \quad (1.13)$$

Using $\epsilon$ we define a section map $\hat{\epsilon}: \Lambda \to \text{Heis}$ given by $\hat{\epsilon}(\lambda) = (\lambda, \epsilon(\lambda))$. One can verify that (1.13) implies that $\hat{\epsilon}$ is a group homomorphism, that is $\hat{\epsilon}(\lambda_1 + \lambda_2) = \hat{\epsilon}(\lambda_1) \cdot \hat{\epsilon}(\lambda_2)$. To summarize, the map $\epsilon$ defines a sectional homomorphic embedding of $\Lambda$ as a subgroup of the Heisenberg group. We refer to $\epsilon$ as a Heisenberg character and to the pair $(\Lambda, \epsilon)$ as a Heisenberg lattice. A simple example is when the lattice $\Lambda$ is rectangular, i.e., $\Lambda = \Lambda_r$. In this situation $\beta|\Lambda = 0$ thus we can take $\epsilon = 1$, corresponding to the trivial embedding $\hat{\epsilon}(\lambda) = (\lambda, 1)$.

A more complicated example is the hexagonal lattice $\Lambda = \Lambda_{hex}$ equipped with $\epsilon_{hex}: \Lambda_{hex} \to S^1$, given by:

$$\epsilon_{hex}(ng_1 + mg_2) = \psi(m^2/4), \quad (1.14)$$

for every n, $m \in \mathbb{Z}$. An Heisenberg lattice defines a commutative subgroup $\Lambda_\epsilon \subset \text{Heis}$ consisting of all elements of the form $(\lambda, \epsilon(\lambda))$, $\lambda \in \Lambda$. The centralizer subgroup of $\text{Im}\hat{\epsilon}$ is the subgroup $\Lambda^\perp \times S^1$. We define the finite subquotient group:

$$\text{Heis}(\Lambda, \epsilon) = \Lambda^\perp \times S^1 / \text{Im}\hat{\epsilon}, \quad (1.15)$$

The group Heis $(\Lambda, \epsilon)$ is a central extension of the finite commutative group $\Lambda^\perp/\Lambda$ by the unit circle $S^1$, that is, it fits in the following exact sequence:

$$S^1 \text{Heis}(\Lambda, \epsilon) \twoheadrightarrow \Lambda^\perp / \Lambda, \quad (1.16)$$

We refer to Heis $(\Lambda, \epsilon)$ as the finite Heisenberg group associated with the Heisenberg lattice $(\Lambda, \epsilon)$. The finite Heisenberg group takes a more concrete from in the rectangular case. Specifically, when $\Lambda = \Lambda_r$ and $\epsilon = 1$, we have Heis$(\Lambda, 1) = \Lambda^\perp / \Lambda \times S^1 = \mathbb{Z}/N \times \mathbb{Z}/N \times S^1$ with multiplication rule given by:

$$(k_1, l_1, z_1) \cdot (k_2, l_2, z_2) = (k_1 + k_2, l_1 + l_2, \psi(l_1 k_2/N) z_1 z_2), \quad (1.17)$$

B1.4 The Heisenberg representation The representation theory of the Heisenberg group is relatively simple. In a nutshell, fixing the action of the center, there is a unique (up-to isomorphism) irreducible representation. This uniqueness is referred to as the Stone-von Neumann property. The precise statement is summarized in Section A1.3: The fact that $\pi$ is a representation, aka multiplicative, translates to the fact that $\Pi$ interchanges between group convolution of functions and composition of linear transformations, i.e., $\Pi(f_1 \circledast f_2) = \Pi(f_1) \cdot \Pi(f_2)$. Since $\pi(0, z) = z \text{Id}_H$, by Fourier theory, its enough to consider only functions $f$ that satisfy the condition $f(v, z) = z^{-1} f(v, 1)$. Identifying such functions with their restriction to $V = V \times \{1\}$ we can write the group convolution in the form:

$$f_1 \circledast f_2(v) = \int_{v_1 + v_2 = v} \psi(\beta(v_1, v_2)) f_1(v_1) f_2(v_2), \quad (1.19)$$

Interestingly, the representation $\pi$, although is unique, admits multitude of realizations. Particularly well known are the time and frequency realizations which are omnipresent in signal processing. We consider the Hilbert space of complex valued functions on the real line $H = \mathbb{C}(\mathbb{R})$. To describe them, we introduce two basic unitary operations on such functions—one called delay and the other modulation, defined as follows:

$$\text{Delay: } L_x(\varphi)(y) = \varphi(y-x), \quad (1.20)$$

$$\text{Modulation: } M_x(\varphi)(y) = \psi(xy)\varphi(y), \quad (1.21)$$

for any value of the parameter $x \in \mathbb{R}$ and every function $\varphi \in H$. Given a point $v = (\tau, v)$ we define the time realization of the Heisenberg representation by:

$$\pi^{time}(v, z) \triangleright > z \cdot L_\tau \cdot M_v(\varphi) \quad (1.22)$$

where we use the notation $\triangleright$ to designate the application of an operator on a vector. It is accustom in this context to denote the basic coordinate function by t (time). Under this convention, the right hand side of (1.22) takes the explicit form $z\psi(v(t-\tau))\varphi(t-\tau)$. Reciprocally, we define the frequency realization of the Heisenberg representation by:

$$\pi^{freq}(v, z) \triangleright \varphi = z \cdot M_{-\tau} \cdot L_v(\varphi), \quad (1.23)$$

In this context, it is accustom to denote the basic coordinate function by $f$ (frequency). Under this convention, the right hand side of (1.23) takes the explicit form $z\psi(-\tau f)\varphi$ $(f-v)$. By Theorem 1.1, the time and frequency realizations are isomorphic. The isomorphism is given by the Fourier transform:

$$FT(\varphi)(f)=\int_t \exp(-2\pi i f t)\varphi(t)dt, \quad (1.24)$$

for every $\varphi \in H$. As an intertwining transform FT interchanges between the two Heisenberg operators $\pi_t(v,z)$ and $\pi_f(v,z)$, i.e.:

$$FT \cdot \pi^{time}(v,z) = \pi^{freq}(v,z) \cdot FT, \quad (1.25)$$

for every $(v,z)$. From the point of view of representation theory the characteristic property of the Fourier transform is the interchanging equation (1.25). Finally, we note that from communication theory perspective, the time domain realization is adapted to modulation techniques where QAM symbols are arranged along a regular lattice of the time domain. Reciprocally, the frequency realization is adapted to modulation techniques (line OFDM) where QAM symbols are arranged along a regular lattice on the frequency domain. We will see in the sequel that there exists other, more exotic, realizations of the signal space which give rise to a family of completely new modulation techniques which we call ZDMA.

The finite Heisenberg representation. It is nice to observe that the theory of the Heisenberg group carry over word for word to the finite set-up. In particular, given an Heisenberg lattice $(\Lambda, \epsilon)$, the associated finite Heisenberg group Heis $(\Lambda, \epsilon)$ admits a unique up to isomorphism irreducible representation after fixing the action of the center. This is summarized in the following theorem.

Theorem 1.2 (Finite dimensional Stone-von Neumann theorem). There is a unique (up to isomorphism) irreducible unitary representation $\pi_\epsilon$: Heis($\Lambda,\epsilon$)→U(H) such that $\pi_\epsilon(0,z)=zId_H$. Moreover $\pi_\epsilon$ is finite dimensional with dim H=N where $N^2 = \#\Lambda^\perp / \Lambda$.

For the sake of simplicity, we focus our attention on the particular case where $\Lambda = \mathbb{Z}(\tau_r,0) \oplus \mathbb{Z}(0,v_r)$ is rectangular and $\epsilon=1$ and proceed to describe the finite dimensional counterparts of the time and frequency realizations of $\pi_\epsilon$. To this end, we consider the finite dimensional Hilbert space $H_N = \mathbb{C}(\mathbb{Z}/N)$ of complex valued functions on the ring $\mathbb{Z}/N$, aka—the finite line. Vectors in $H_N$ can be viewed of as uniformly sampled functions on the unit circle. As in the continuous case, we introduce the operations of (cyclic) delay and modulation:

$$L_n(\varphi)(m)=\varphi(m-n) \quad (1.26)$$

$$M_n(\varphi)(m)=\psi(nm/N)\varphi(m), \quad (1.27)$$

for every $\varphi \in H_N$ and $n \in \mathbb{Z}/N$ noting that the operation m−n is carried in the cyclic ring $\mathbb{Z}/N$. Given a point $(k/v_r, l/\tau_r) \in \Lambda^\perp$ we define the finite time realization by:

$$\pi_\epsilon^{time}(k/v_r,l/\tau_r,z)t)\triangleright \varphi = z \cdot L_k \cdot M_l(\varphi) \quad (1.28)$$

Denoting the basic coordinate function by n we can write the right hand side of (1.28) in the explicit form $z\psi(l(n-k)/N)\varphi(n-k)$. Reciprocally, we define the finite frequency realization by:

$$\pi_\epsilon^{freq}(k/v_r,l/\tau_r,z)\triangleright \varphi = z \cdot M_{-k} \cdot L_l(\varphi), \quad (1.29)$$

Denoting the basic coordinate function by m the right hand side of (1.29) can be written in the explicit form $z\psi(-km/N)\varphi(m-l)$. By Theorem 1.2, the discrete time and frequency realizations are isomorphic and the isomorphism is realized by the finite Fourier transform:

$$FFT(\varphi)(m)=\sum_{n=0}^{N-1} \exp(-2\pi i mn/N)\varphi(n), \quad (1.30)$$

As an intertwining transform the FFT interchanges between the two Heisenberg operators $\pi_\epsilon^{time}(v,z)$ and $\pi_\epsilon^{freq}(v,z)$, i.e.:

$$FFT \cdot \pi_\epsilon^{time}(v,z) = \pi_\epsilon^{freq}(v,z) \cdot FFT, \quad (1.31)$$

for every $(v,z) \in$ Heis$(\Lambda,\epsilon)$.

B2. The Zak realization

B2.1 Zak waveforms See previous discussion in A2.2. In this section we describe a family of realizations of the Heisenberg representation that simultaneously combine attributes of both time and frequency. These are known in the literature as Zak type or lattice type realizations. A particular Zak realization is parametrized by a choice of an Heisenberg lattice $(\Lambda, \epsilon)$ where $\Lambda$ is critically sampled. A Zak waveform is a function $\varphi: V \to \mathbb{C}$ that satisfies the following quasi periodicity condition: $(2.1) \varphi(v+\lambda) = \epsilon(\lambda)\psi(\beta(v,\lambda))\varphi(v)$ There is an alternative formulation of condition (2.1) that is better suited when considering generalizations. The basic observation is that the map E defines a one dimensional representation $\pi_\epsilon: \Lambda \times S^1 \to U(\mathbb{C})$ satisfying the extra condition that $\pi_\epsilon(0,z)=z$. This representation is given by $\pi_\epsilon(\lambda,z) = \epsilon(\lambda)^{-1} z$. Indeed, verify that:

$$\pi_\epsilon(\lambda_1, z_1) \cdot \pi_\epsilon(\lambda_2, z_2) = \epsilon(\lambda_1)^{-1}\epsilon(\lambda_2)^{-1} z_1 z_2 \quad (2.2)$$

$$= \epsilon(\lambda_1+\lambda_2)^{-1} \psi(\beta(\lambda_1,\lambda_2)) z_1 z_2$$

$$= \pi_\epsilon((\lambda_1, z_1) \cdot (\lambda_2, z_2)),$$

In addition, we have that $\pi_\epsilon(\lambda, \hat{\epsilon}(\lambda))=1$ implying the relation Im$\hat{\epsilon} \subset$ ker $\pi_\epsilon$. Hence $\pi_\epsilon$ is in fact a representation of the finite Heisenberg group Heis $(\Lambda,\epsilon) = \Lambda \times S^1/\text{Im}\hat{\epsilon}$. Using the representation $\pi_\epsilon$, we can express (2.1) in the form:

$$\varphi(v+\lambda) = \psi(\beta(v,\lambda))\{\pi_\epsilon(\lambda)^{-1} \triangleright \varphi(v)\} \quad (2.3)$$

We denote the Hilbert space of Zak waveforms by H $(V,\pi_\epsilon)$ or sometimes for short by 15 $H_\epsilon$. For example, in the rectangular situation where $\Lambda = \Lambda_r$ and $\epsilon=1$, condition (2.1) takes the concrete form $\varphi(\tau+k\tau_r, v+lv_r) = \psi(vk\tau_r)\varphi(\tau,v)$, that is, $\varphi$ is periodic function along the Doppler dimension (with period $v_r$) and quasi-periodic function along the delay dimension. Next, we describe the action of the Heisenberg group on the Hilbert space of Zak waveforms. Given a Zak waveform $\varphi \in H_\epsilon$, and an element $(u, z) \in$ Heis, the action of the element on the waveform is given by:

$$\{\pi^\epsilon(u,z) \triangleright \varphi\}(v) = z \cdot \psi(\beta(u,v-u))\varphi(v-u), \quad (2.4)$$

In addition, given a lattice point $\lambda \in \Lambda$, the action of the element $\hat{\epsilon}(\lambda) = (\lambda, \epsilon(\lambda))$ takes the simple form:

$$\{\pi^\epsilon(\lambda,\epsilon(\lambda)) \triangleright \varphi\}(v) = \epsilon(\lambda)\psi(\beta(\lambda, v-\lambda))\varphi(v-\lambda) \quad (2.5)$$

$$= \epsilon(\lambda)\epsilon(-\lambda)\psi(\beta(\lambda,-\lambda))\psi(\omega(\lambda, v))\varphi(v)$$

$$= \psi(\omega(\lambda, v))\varphi(v),$$

where in the first equality we use (2.4), in the second equality we use (2.1) and the polarization equation (1.3) and in the third equality we use (1.13). To conclude, we see that $\pi^\epsilon(\hat{\epsilon}(\lambda))$ is given by multiplication with the symplectic Fourier exponent associated with the point λ. As usual, the representation gives rise to an extended action by functions on V. Given a function h∈ℂ(V), its action on a Zak waveform:

$$\{\pi^\epsilon(h) \triangleright \varphi\}(v) = \int_{u \in V} h(u)\{\pi^\epsilon(u) \triangleright \varphi\}(v)du \quad (2.6)$$

$$= \int_{u \in V} \psi(\beta(u, v-u))h(u)\varphi(v-u)du,$$

From the last expression we conclude that $\Pi^\epsilon(h) \triangleright \varphi = h \circledast \varphi$, namely, the extended action is realized by twisted convolution of the impulse h with the waveform v.

B2.2 Zak transforms See also section A2.4. By Theorem 1.1, the Zak realization is isomorphic both to the time and frequency realizations. Hence there are intertwining transforms interchanging between the corresponding Heisenberg group actions. These intertwining transforms are usually referred to in the literature as the time/frequency Zak transforms and we denote them by:

$$Z_{time,\epsilon}: H_\epsilon \to H_{time} = \mathbb{C}(t \in \mathbb{R}), \quad (2.7)$$

$$Z_{freq,\epsilon}: H_\epsilon \to H_{freq} = \mathbb{C}(f \in \mathbb{R}), \quad (2.8)$$

As it turns out, the time/frequency Zak transforms are basically geometric projections along the reciprocal dimensions, see FIG. 2. Formally, this assertion is true only when the maximal rectangular sublattice $\Lambda_r = \mathbb{Z}(\tau_r, 0) \oplus \mathbb{Z}(0, v_r)$ is non-trivial, i.e., when the rectangular parameters $\tau_r, v_r < \infty$. Assuming this condition holds, let $N = \tau_r \cdot v_r$ denote the index of the rectangular sublattice $\Lambda_r$ with respect to the full lattice Λ, i.e., $N = [\Lambda_r : \Lambda]$. For example, when $\Lambda = \Lambda_{rec}$ we have $\tau_r = v_r = 1$ and $N = 1$. When $\Lambda = \Lambda_{hex}$, we have $\tau_r = a$ and $v_r = 2/a$ and consequently $N = 2$. Without loss of generality, we assume that $\epsilon|\Lambda_r = 1$.

Granting this assumption, we have the following formulas:

$$Z_{time,\epsilon}(\varphi)(t) = \int_0^{v_r} \varphi(t,v)dv, \quad (2.9)$$

$$Z_{freq,\epsilon}(\varphi)(f) = \int_0^{\tau_r} \psi(-f\tau)\varphi(\tau,f)d\tau, \quad (2.10)$$

We now proceed describe the intertwining transforms in the opposite direction, which we denote by:

$$Z_{\epsilon,time}: H_{time} \to H_\epsilon, \quad (2.11)$$

$$Z_{\epsilon,freq}: H_{freq} \to H_\epsilon, \quad (2.12)$$

To describe these we need to introduce some terminology. Let $\pi_r^{time}$ and $b^{freq}$ denote the time and frequency realizations of the Heisenberg representation of the group Heis $(\Lambda_r, 1)$ $b^{time}, b^{freq} \in \mathbb{C}^N$ are the unique (up to multiplication by scalar) invariant vectors under the action of $\Lambda_\epsilon$ through $\pi_r^{time}$ and $\pi_r^{freq}$ respectively. The formulas of (2.11) and (2.12) are:

$$Z_{\epsilon,time}(\varphi)(\tau, v) = \sum_{k=0}^{N-1} \sum_{n \in \mathbb{Z}} b^{time}[k]\psi(-v\tau_r(k/N+n))\varphi(\tau + \tau_r(k/N+n)), \quad (2.13)$$

$$Z_{\epsilon,freq}(\varphi)(\tau, v) = \quad (2.14)$$

$$\psi(\tau v)\sum_{k=0}^{N-1} \sum_{n \in \mathbb{Z}} b^{freq}[k]\psi(\tau v_r(k/N+n))\varphi(v + v_r(k/N+n)),$$

In the rectangular situation where $\Lambda = \Lambda_r$ and $\epsilon = 1$, we have $N = 1$ and $b^{time} = b^{freq} = 1$. Substituting these values in (2.13) and (2.14) we get:

$$Z_{\epsilon,time}(\varphi)(\tau, v) = \sum_{n \in \mathbb{Z}} \psi(-v\tau_r n)\varphi(\tau + n\tau_r), \quad (2.15)$$

$$Z_{\epsilon,freq}(\varphi)(\tau, v) = \psi(\tau v)\sum_{n \in \mathbb{Z}} \psi(\tau v_r n)\varphi(v + nv_r), \quad (2.16)$$

In addition, in the hexagonal situation where $\Lambda = \Lambda_{hex}$ and $\epsilon = \epsilon_{hex}$, we have $N = 2$, $\tau_r = a$, $v_r = 2a^{-1}$ and $b^{time} = (1, i)$, $b^{freq} = (1, -i)$. Substituting these values in (2.11) and (2.12) we get:

$$Z_{\epsilon,time}(\varphi)(\tau, v) = \quad (2.17)$$
$$\sum_{n \in \mathbb{Z}} \psi(-van)\varphi(\tau + an) + i\sum_{n \in \mathbb{Z}} \psi(-va(1/2+n))\varphi(\tau + a(1/2+n)),$$

$$Z_{\epsilon,freq}(\varphi)(\tau, v) = \psi(\tau v)\sum_{n \in \mathbb{Z}} \psi(2\tau a^{-1}n)\varphi(v + 2a^{-1}n) - \quad (2.18)$$
$$i\psi(\tau v)\sum_{n \in \mathbb{Z}} \psi(2\tau a^{-1}(n+1/2))\varphi(v + 2a^{-1}(n+1/2))$$

Figure 15:
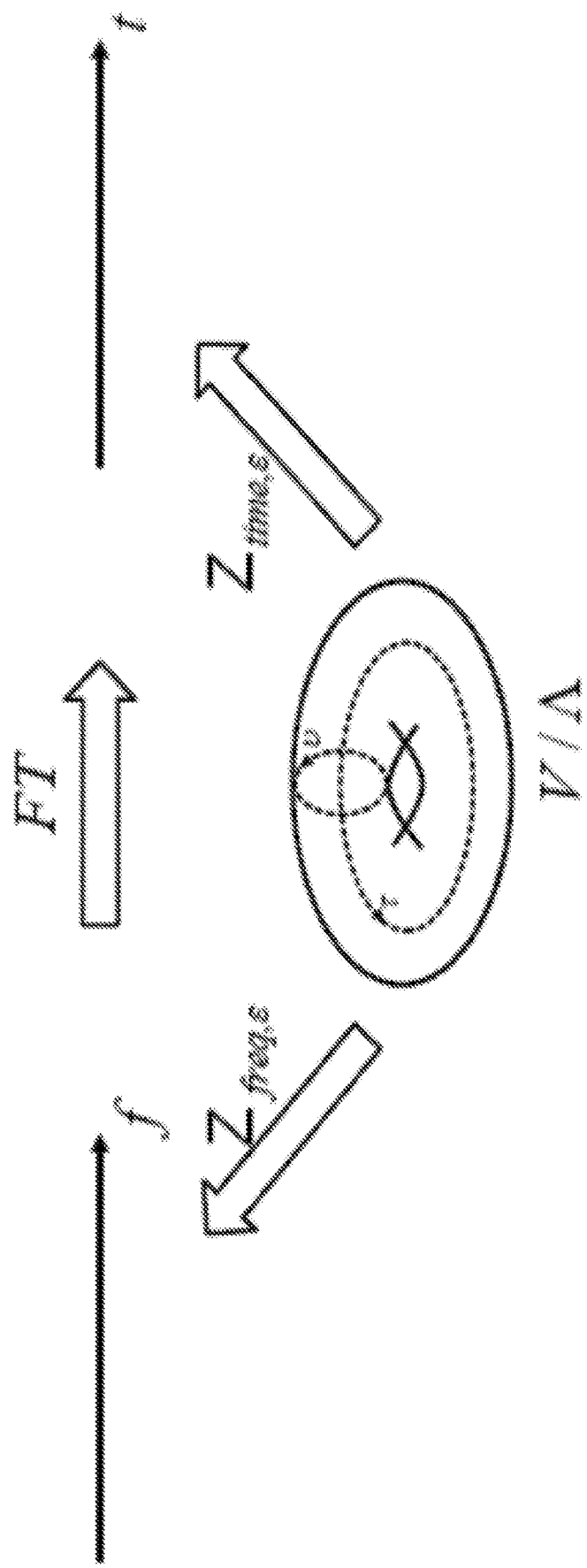
FIG. 15 pictorially depicts an example in which the Zak domain and the time/frequency Zak transforms realizing the signal space realization lying in between time and frequency realizations.

Furthermore, one can show that $Z_{time,\epsilon} \cdot Z_{\epsilon,freq} \propto FT$ hence the pair of Zak transforms constitute a square root decomposition of the Fourier transform, reinforcing the interpretation of the Zak realization as residing between the time and the frequency (see FIG. 15). As mentioned before, the characteristic property of the Zak transform is that it interchanges between the Heisenberg group actions.

Proposition 2.1. We have:

$$Z_{time,\epsilon}(\pi^\epsilon(v,z) \triangleright \varphi) = \pi^{time}(v,z) \triangleright Z_{time,\epsilon}(\varphi), \quad (2.19)$$

$$Z_{freq,\epsilon}(\pi^\epsilon(v,z) \triangleright \varphi) = \pi^{freq}(v,z) \triangleright Z_{freq,\epsilon}(\varphi), \quad (2.20)$$

for every $\varphi \in H_\epsilon$ and (v, z) ∈ Heis

Example 2.2. As an example we consider the rectangular lattice $\Lambda_r = \mathbb{Z}(\tau_r, 0) \oplus \mathbb{Z}(0, 1/\tau_r)$ and the trivial Heisenberg character $\epsilon = 1$. Under these choices, we describe the Zak realization of the window function:

$$p(t) = \begin{cases} 1 & 0 \le t < \tau_r \\ 0 & \text{otherwise} \end{cases}, \quad (2.21)$$

This function is typically used as the generator filter in multi-carrier modulations (without CP). A direct application of formula (2.15) reveals that $P = Z_{\epsilon,time}(p)$ is given by:

$$P(\tau, v) = \sum_{n \in \mathbb{Z}} \psi(vn\tau_r)p(\tau - n\tau_r), \quad (2.22)$$

One can show that $P(a\tau_r, b/\tau_r) = 1$ for every a, b ∈ [0,1), which means that it is of constant modulo 1 with phase given by a regular step function along τ with constant step given by the Doppler coordinate v. Note the discontinuity of P as it jumps in phase at every integer point along delay. This phase discontinuity is the Zak domain manifestation of the discontinuity of the rectangular window p at the boundaries.

B3. The Generalized Zak Realization

For various computational reasons that arise in the context of channel equalization we need to extend the scope and consider also higher dimensional generalizations of the standard scalar Zak realization. Specifically, a generalized Zak realization is a parametrized by an under-sampled Heisenberg lattice $(\Lambda, \epsilon)$. Given this choice, we fix the following structures:

Let Heis $(\Lambda, \epsilon) = \Lambda^{\perp} \times S^1/\Lambda_\epsilon$, be the finite Heisenberg group associated with $(\Lambda, \epsilon)$, see Formula (1.15). Let $N^2 = [\Lambda : \Lambda^{\perp}]$ be the index of $\Lambda$ inside $\Lambda^{\perp}$. Finally, let $\pi_\epsilon$ be the finite dimensional Heisenberg representation of Heis $(\Lambda, \epsilon)$. At this point we are not interested in any specific realization of the representation $\pi_\epsilon$.

A generalized Zak waveform is a vector valued function $\varphi: V \to \mathbb{C}^N$ that satisfy the following it, quasi-periodicity condition:

$$\varphi(v+\lambda) = \psi(\beta(v,\lambda))\{\pi_\epsilon(\lambda)^{-1\triangleright}\varphi(v)\}, \quad (3.1)$$

for every $v \in V$ and $\lambda \in \Lambda^{\perp}$. Observe that when the lattice $\Lambda$ is critically sampled, we have $N=1$ and condition (3.1) reduces to (2.3). In the rectangular situation where $\Lambda = \Lambda_r$, $\epsilon = 1$ we can take $\pi_\epsilon = \pi_\epsilon^{time}$, thus the quasi-periodicity condition (3.1) takes the explicit form:

$$\varphi(\tau+k/v_r, v+l/\tau_r) = \psi(vk/v_r)\{\psi(kl/N)M_{-l}L_{-k}{}^{\triangleright}\varphi(\tau,v)\}, \quad (3.2)$$

where we substitute $v=(\tau, v)$ and $\lambda=(k/v_r, l/\tau_r)$. In particular, we see from (3.2) that the nth coordinate of $\omega$ satisfies the following condition along Doppler:

$$\varphi_n(\tau, v+l/\tau_r) = \psi(-nl/N)\varphi_n(\tau, v), \quad (3.3)$$

for every $(\tau, v) \in V$ and $l \in \mathbb{Z}$. We denote by $H_\epsilon = H(V, \pi_\epsilon)$ the Hilbert space of generalized Zak waveforms. We now proceed to define the action of Heisenberg group on $H_\epsilon$. The action formula is similar to (2.4) and is given by:

$$\{\pi^\epsilon(v,z)^{\triangleright}\varphi\}(v') = z \cdot \psi(\beta(v,v'-v))\varphi(v'-v), \quad (3.4)$$

for every $\varphi \in H_\epsilon$ and $(v,z) \in$ Heis. Similarly, we have $\{\pi^\epsilon(\lambda, \epsilon(\lambda))^{\triangleright}\varphi\}(v) = \psi(\omega(\lambda, v))\varphi(v)$, for every $\lambda \in \Lambda$.

3.1 Zak to Zak Intertwining Transforms

Figure 16:
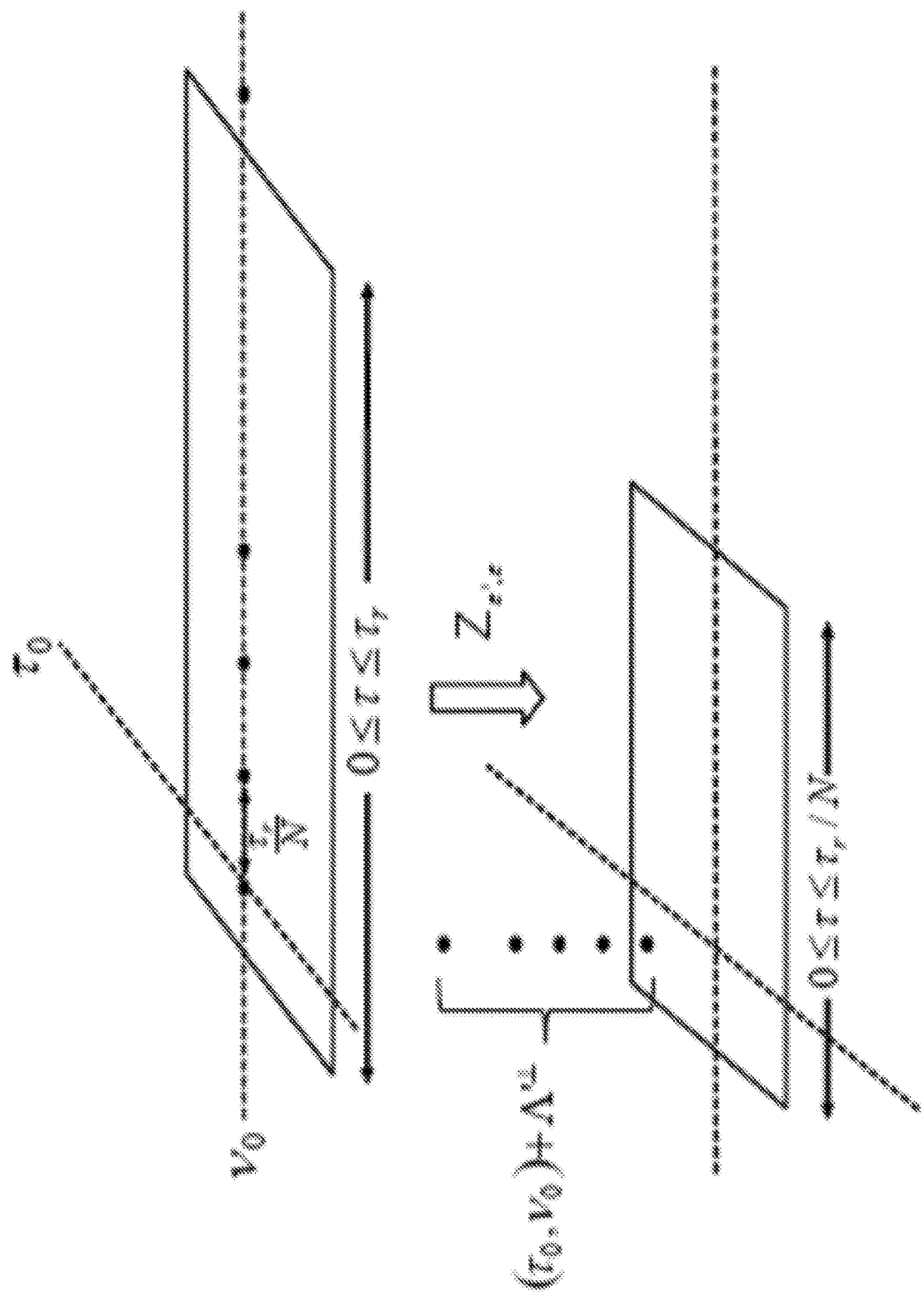
FIG. 16 shows a depiction of the Zak to generalized Zak intertwining transformation.

The standard and the generalized Zak realizations of the Heisenberg representation are isomorphic in the sense that there exists a non-zero intertwining transform commuting between the corresponding Heisenberg actions. To describe it, we consider the following setup. We fix a critically sampled Heisenberg lattice $(\Lambda, \epsilon)$ and a sub-lattice $\Lambda' \subset \Lambda$ of index N. We denote by $\epsilon'$ the restriction of $\epsilon$ to the sub-lattice $\Lambda'$. Our goal is to describe the intertwining transforms (See FIG. 16):

$$Z_{\epsilon, \epsilon'}: H_\epsilon \to H_{\epsilon'}, \quad (3.5)$$

$$Z_{\epsilon', \epsilon}: H_{\epsilon'} \to H_\epsilon, \quad (3.6)$$

We begin with the description of $Z_{\epsilon, \epsilon'}$. Let $\zeta \in \mathbb{C}^N$ be the unique (up-to multiplication by scalar) invariant vector under the action of the subgroup $V^\epsilon = \epsilon(V) \subset$ Heis $(\Lambda', \epsilon')$ through the representation $\pi_{\epsilon'}$, namely, $\zeta$ satisfies the condition:

$$\pi_{\epsilon'}(\lambda, \epsilon(\lambda))^{\triangleright}\zeta = \zeta,$$

for every $\lambda \in \Lambda$. Given a generalized Zak waveform $\varphi \in H_{\epsilon'}$, the transformed waveform $Z_{\epsilon, \epsilon'}(\varphi)$ is given by:

$$Z_{\epsilon, \epsilon'}(\varphi)(v) = \langle \zeta, \varphi(v) \rangle, \quad (3.7)$$

for every $v \in V$. In words, the transformed waveform is defined pointwise by taking the inner product with the invariant vector $\zeta$. We proceed with the description of $Z_{\epsilon', \epsilon}$. To this end, we define the Hilbert space of sampled Zak waveforms. A sampled Zak waveform is a function $\phi: \Lambda^{\perp} \to \mathbb{C}$ satisfying the following discrete version of the quasi-periodicity condition (2.3):

$$\phi(\delta+\lambda) = \psi(\beta(\delta,\lambda))\pi_\epsilon(\lambda)^{-1\triangleright}\phi(\delta), \quad (3.8)$$

for every $\delta \in \Lambda'^{\perp}$ and $\lambda \in \Lambda$. We denote the Hilbert space of sampled Zak waveforms by H $(\Lambda'^{\perp}, \pi_\epsilon)$. One can show that $H(\Lambda'^{\perp}, \pi_\epsilon)$ is a finite dimensional vector space of dimension $[\Lambda : \Lambda'^{\perp}] = [\Lambda' : \Lambda] = N$. The Hilbert space of sampled Zak waveforms admits an action of the finite Heisenberg group Heis $(\Lambda', \epsilon')$. This action is a discrete version of 2.4) given by:

$$\{\pi_\epsilon(\delta, z)^{\triangleright}\phi\}(\delta') = z\psi(\beta(\delta, \delta'-\delta))\phi(\delta'-\delta), \quad (3.9)$$

for every $\phi \in H(\Lambda'^{\perp}, \pi_\epsilon)$, and points $\delta, \delta' \in \Lambda'^{\perp}$. We can now define the intertwining transform $Z_{\epsilon', \epsilon}$.

Given a Zak waveform $\varphi \in H_\epsilon$ the transformed generalized waveform $\varphi' = Z_{\epsilon', \epsilon}(\varphi)$ is a function on V taking values in the N dimensional Hilbert space $H(\Lambda'^{\perp}, \pi_\epsilon) \cong \mathbb{C}^N$, defined by:

$$\varphi'(v)(\delta) = \psi(-\beta(v, \delta))\varphi(v+\delta), \quad (3.10)$$

for every $v \in V$ and $\delta \in \Lambda'^{\perp}$. For the sake of concreteness, it is beneficial to describe in detail the rectangular situation. We consider a rectangular lattice $\Lambda = \Lambda_r$, with trivial embedding $\epsilon = 1$ and the sublattice $\Lambda' = \mathbb{Z}(\tau_r, 0) \oplus \mathbb{Z}(0, Nv_r)$. Evidently, we have $[\Lambda' : \Lambda] = N$. For these particular choices, the structures described above take the following concrete form:

The finite Heisenberg group associated with $(\Lambda, \epsilon)$ is given by:

$$\text{Heis}(\Lambda, \epsilon) = \Lambda^{\perp}/\Lambda \times S^1 \cong S^1,$$

The finite Heisenberg representation of Heis $(\Lambda, \epsilon)$, is given by:

$$\pi_\epsilon(z) = z,$$

The orthogonal complement lattice of $\Lambda'$ is given by:

$$\Lambda'^{\perp} = \mathbb{Z}(\tau_r/N, 0) \oplus \mathbb{Z}(0, v_r),$$

The finite Heisenberg group associated with $(\Lambda', \epsilon')$ is given by:

$$\text{Heis}(\Lambda', \epsilon') = \Lambda'^{\perp}/\Lambda \times S^1 \cong \mathbb{Z}/N \times \mathbb{Z}/N \times S^1,$$

The finite Heisenberg representation of Heis $(\Lambda', \epsilon')$, is given by $\pi_{\epsilon'} = \pi_{\epsilon'}^{time}$, where:

$$\pi_{\epsilon'}^{time}(k\tau_r/N, lv_r, z) = zL_k M_l,$$

The invariant vector under $\pi_{\epsilon'}(\lambda, \epsilon'(\lambda)) = \pi_\epsilon(\lambda, \epsilon'(\lambda))$, $\lambda \in \Lambda$ is given by:

$$\zeta = \delta(0),$$

Substituting in Formula (3.7), we get:

$$Z_{\epsilon, \epsilon'}(\varphi)(v) = \langle \delta(0), \varphi(v) \rangle \quad (3.11)$$
$$= \varphi_0(v)$$

In words, the conversion from generalized to standard Zak waveforms is "simply" to take the zero coordinate at each point $v \in V$. In the opposite direction, given a Zak waveform $\varphi \in H(V, \pi_\epsilon)$ its restriction to the lattice $\Lambda'^{\perp}$ is periodic with respect to translations by elements of $\Lambda$, hence is a function on the quotient group $\Lambda'^{\perp}/\Lambda = \mathbb{Z}/N$, i.e., a vector in $\mathbb{C}(\mathbb{Z}/N)$. Substituting in Formula (3.10), we get that:

$$Z_{\epsilon', \epsilon}(\varphi)(\tau, v) = \begin{bmatrix} \psi(-v\tau_r \cdot 0/N)\varphi(\tau, v) \\ \psi(-v\tau_r/N)\varphi(\tau + \tau_r/N, v) \\ \vdots \\ \psi(-v\tau_r(1-1/N))\varphi(\tau + \tau_r(1-1/N), v) \end{bmatrix},$$

for every $\varphi \in H(V, \pi_\epsilon)$ and $(\tau, v) \in V$.

B4. ZDMA Transceiver Embodiments

In this section we describe the structure of the ZDMA transceiver incorporating the Zak realization formalism. In addition, we describe a weaker version that can be implemented as a preprocessing step over multi-carrier modulation.

B4.1 Transceiver Parameters

The ZDMA transceiver structure is based on the following parameters:

(1) An Heisenberg critically sampled lattice $(\Lambda, \epsilon)$ giving rise to the Hilbert space of Zak waveforms $H(V, \pi_\epsilon)$.
(2) A transmit and receive filter functions $w_{tx}, w_{rx} \in \mathbb{C}(V)$.
(3) A non-degenerate pulse waveform $\varphi \in H(V, \pi_\epsilon)$ satisfying $P(v) \neq 0$ for every $v \in V$.

The transmit function $w_{tx}$ is a function on the delay Doppler plane that plays the role of a two dimensional filter, shaping the transmitted signal to a specific bandwidth and specific time duration. The receive function $w_{rx}$ is principally the matched filter to $w_{tx}$. We will assume, henceforth that it is defined as $w_{rx} = w_{tx}^\star$:

$$\omega_{rx}(v) = \omega_{tx}^\star(v) \qquad (4.1)$$
$$= \psi(-\beta(v, v)) \, \overline{\omega_{tx}(-v)},$$

for every $v \in V$. In addition, we assume that the function $w = w_{tx}$ can be decomposed as a twisted/Heisenberg convolution $w = w_\tau \circledast w_v$ where $w_\tau$ is a one dimensional function supported on the delay axis and $w_v$ is one dimensional function supported on the Doppler axis. One can verify that:

$$w(\tau, v) = w_\tau(\tau) w_v(v), \qquad (4.2)$$

for every $(\tau, v) \in \mathbb{R}^2 = V$. The benefit in considering such decomposable filters is that most of their attributes can be expressed in terms of simple analysis of the two factors. In particular, in this situation the received matched function is given by $w_{rx}^\star = w_v^\star \circledast w_\tau^\star$ where $w_\tau^\star$ and $w_v^\star$ are the respected one dimensional conjugate functions familiar from standard signal processing, i.e.:

$$w_\tau^\star(\tau) = \overline{w_\tau(-\tau)}, \qquad (4.3)$$

$$w_v^\star(v) = \overline{w_v(-v)}, \qquad (4.4)$$

for every $\tau \in \mathbb{R}$ and $v \in \mathbb{R}$ respectively. In typical situation, we require the one dimensional filter $w_\tau$ to be a square root Nyquist with respect to a bandwidth $B > 0$, i.e., $w_\tau^\star * w_\tau(k/B) = 0$ for every non-zero integer k, and, reciprocally, we require the one dimensional filter $w_v$ to be square root Nyquist with respect to a duration $T > 0$, i.e., $w_v^\star * w_v(l/T) \neq 0$ for every non-zero integer l. To proceed further we need to choose a basis of the lattice $\Lambda$:

$$\Lambda = \mathbb{Z} g_1 \oplus \mathbb{Z} g_2, \qquad (4.5)$$

Granting such a choice we can define the pulse P to be the unique quasi-periodic function that satisfy $P(ag_1 + bg_2)$ for every $0 \leq a, b \leq 1$. Note that when the lattice is rectangular and the basis is the standard one, such pulse is described in Example 2.2. Before describing the transceiver structure we need to explain how to encode the information bits. These are encoded into a periodic function $x \in \mathbb{C}(V)$ with respect to the lattice $\lambda$. In typical situations we assume that x is a sampled $\Lambda$—periodic function of the form:

$$x = \sum_{n,m} x[n,m] \delta(ng_1/N + mg_2/M), \qquad (4.6)$$

where $N, M \in \mathbb{N}^{\geq 1}$ are fixed parameters defining the density of the delay Doppler information lattice $\Lambda_{N,M} = \mathbb{Z} g_1/N \oplus \mathbb{Z} g_2/M$. In more canonical terms, x is a function on the information lattice $\Lambda_{N,M}$ that is periodic with respect to the sub-lattice $\Lambda \in \Lambda_{N,M}$. The expression for x is particularly simple when the lattice is rectangular. In this case it takes the form:

$$x = \sum_{n,m} x[n,m] \delta(n\tau_r/N) \delta(mv_r/M), \qquad (4.7)$$

B4.2 Transceiver structure

Having specified the underlying structures and parameters we are now ready to describe the ZDMA modulation and de-modulation transforms. Given a periodic function $x \in \mathbb{C}(V/\Lambda)$ encoding the information bits, we define the modulated waveform $\varphi_{tx} = M(x)$ through the rule:

$$M(x) = Z_{time,\epsilon}\left(\prod\nolimits^\epsilon (w_{tx}) \triangleright (x \cdot P)\right) \qquad (4.8)$$
$$= Z_{time,\epsilon}(w_{tx} \circledast (x \cdot P))$$

where $Z_{time,\epsilon}$ is the Zak transform converting between Zak and time domain waveforms, see (2.7). In words, the modulation first transforms the information function into a Zak waveform through multiplication by multiplication with P. Next, it shapes the bandwidth and duration of the waveform through twisted convolution with the two dimensional filter w. Last, it transforms the tamed Zak waveform into a time domain waveform through application of the Zak transform. To get a better understanding of the structure of the transmit waveform and the actual effect of two dimensional filtering we apply several algebraic manipulations to get more concrete expressions. First, we note that $Z_{time,\epsilon}$ is an intertwining transform thus obeying the relation:

$$Z_{time,\epsilon}(\Pi^\epsilon(w_{tx}) \triangleright (x \cdot P)) = \Pi^{time}(w_{tx}) \triangleright Z_{time,\epsilon}(x \cdot P), \qquad (4.9)$$

Second, assuming $w_{tx} = w_\tau \circledast w_v$, we can write $\Pi^{time}(w_\tau \circledast w_v)$ as the composition time $\Pi^{time}(w_\tau) \cdot \Pi^{time}(w_v)$, thus expressing the two dimensional filtering operation as cascade of two consecutive one dimensional operations:

$$M(x) = \prod\nolimits^{time}(w_\tau \circledast w_v) \triangleright Z_{time,\epsilon}(x \cdot P) \qquad (4.10)$$
$$= \prod\nolimits^{time}(W_t) \triangleright \prod\nolimits^{time}(w_v) \triangleright Z_{time,\epsilon}(x \cdot P)$$
$$= w_\tau * \{W_t \cdot Z_{time,\epsilon}(x \cdot P)\},$$

where * stands for linear convolution on $\mathbb{R}$ and $W_t = FT^{-1}(w_v)$. We refer to the waveform $Z_{time,\epsilon}(x \cdot P)$ as the bare ZDMA waveform. We see from Formula (4.10) that the transmit waveform is obtained from the bare waveform by applying the time window $W_t$ followed by a convolution with the pulse $w_\tau$. In addition, one can verify that when x is sampled on the lattice $\Lambda_{N,M} \subset V$, see (4.6), the bare waveform is an infinite delta pulse train along the lattice:

$$\Lambda_{N,M}^{time} = \{n/Ng_1[1] + m/Mg_2[1] : n, m \in \mathbb{Z}\}, \qquad (4.11)$$

where the lattice $\Lambda_{N,M}^{time}$ is the projection of the lattice $\Lambda_{N,M}$ on the delay axis. The projected lattice takes a particularly simple form when $\Lambda=\Lambda_r$ is rectangular. In this case we have:

$$\Lambda_{N,M}^{time}=\mathbb{Z}\,\tau_r/N, \quad (4.12)$$

We now proceed to describe the de-modulation mapping. Given a received waveform $\varphi_{rx}$ we define its de-modulated image $y=D(\varphi_{rx})$ through the rule:

$$D(\varphi_{rx})=\Pi^\epsilon(w_{rx})^\triangleright Z_{\epsilon,time}(\varphi_{rx}), \quad (4.13)$$

We stress the fact that y is a Zak waveform (to be distinguished from a periodic function). We often incorporate as part of the de-modulation mapping another step of sampling y on the lattice $\Lambda_{N,M}$, thus obtaining a sampled Zak waveform $y_s \in H(\Lambda_{N,M},\pi_\epsilon)$ which is a function on $\Lambda_{N,M}$ satisfying the quasi periodicity condition:

$$y_s(\delta+\lambda)=\psi(\beta(\delta,\lambda))\pi_\epsilon(\lambda)^{-1\triangleright}y_s(\delta), \quad (4.14)$$

To conclude, assuming $x=x_s \in \mathbb{C}\,(\Lambda_{N,M}/\Lambda)$ is a sampled periodic function, the ZDMA transceiver chain converts it into a sampled Zak waveform $y_s \in H(\Lambda_{N,M},\pi_\epsilon)$. Overall, the composition transform D·M is a linear transformation:

$$D\cdot M: \mathbb{C}\,(\Lambda_{N,M}/\Lambda) \to H(\Lambda_{N,M},\pi_\epsilon), \quad (4.15)$$

taking sampled periodic functions to sampled Zak waveforms. In particular, we have that both the domain and range of D·M are finite dimensional vector spaces of dimension N·M. In the next subsection we will analyze in more detail the exact relation between the input variable x and the output variable y.

B4.3 Input output relation We first assume the channel between the transmitter and receiver is trivial. Furthermore, we assume the received filter is matched to the transmit filter, i.e., $w_{rx}=w_{tx}{}^\star$. For simplicity we denote $w=w_{tx}$ and assume w is decomposable, i.e., $w=w_\tau \circledast w_\nu$. At this stage we do not assume anything about the specific structure of the one dimensional filters $w_\tau$ and $w_\nu$. Given an input function $x \in \mathbb{C}\,(V/\Lambda)$, a direct computation reveals that $y=D\cdot M(x)$ is given by:

$$y = \prod{}^\epsilon (w^\star) \triangleright \prod{}^\epsilon (w) \triangleright (x \cdot P) \quad (4.16)$$
$$= \prod{}^\epsilon (w^\star \circledast w) \triangleright (x \cdot P)$$
$$= (w^\star \circledast w) \circledast (x \cdot P),$$

So we see that y is given by the twisted convolution of x·P by the auto-correlation filter $w^\star \circledast w$. Our goal is to calculate an explicit formula for $w^\star \circledast w$. First we note that since $w^\star = w_\nu{}^\star \circledast w_\tau{}^\star$, we can write:

$$w^\star \circledast w = w_\nu{}^\star \circledast w_\tau{}^\star \circledast w_\tau \circledast w_\nu \quad (4.17)$$
$$= w_\nu{}^\star \circledast w_\tau^{(2)} \circledast w_\nu,$$

where $w_\tau^{(2)}=w_\tau{}^\star=w_\tau{}^\star * w_\tau$ is the one dimensional auto-correlation function of the delay filter $w_\tau$. In addition, since $w_\tau^{(2)}$ is supported on the $\tau$ axis and $w_\nu{}^\star$ is supported on $\nu$ axis, we have the following simple relation:

$$w_\nu{}^\star \circledast w_\tau^{(2)}(\tau,\nu) = w_\tau^{(2)}(\tau) \otimes \psi(\tau\nu)w_\nu{}^\star(\nu) \quad (4.18)$$
$$= w_\tau^\star(\tau) \otimes M_\tau[w_\nu{}^\star](\nu),$$

Thus, for any given point $(\tau,\nu)$, we can write $w^\star \circledast (\tau,\nu)$ in the form:

$$w^\star \circledast w(\tau,\nu)=w_\tau^{(2)}(\tau) \oplus \otimes \tilde{w}_\nu^{(2)}(\nu), \quad (4.19)$$

where $\tilde{w}_\nu^{(2)}=M_\tau[w_\nu{}^\star] \circledast w_\nu$. We note that the definition of $\tilde{w}_\nu^{(2)}$ depends on the point $\tau$ which is not apparent from the notation we use. Formula (4.19) is always true and is pivotal to get approximations of $w^\star \circledast w$ under various assumptions on the filters $w_\tau$ and $w_\nu$. The case of interest for us is when $w_\tau$ and $w_\nu$ are square root Nyquist with respect to a bandwidth B and a duration $T \in \mathbb{R}^{\geq 0}$ respectively and, in addition, $B \cdot T \gg 1$. In this case we can approximate $\tilde{w}_\nu{}^\star(\nu) = \psi(\tau\nu)w_\nu{}^\star(\nu) \sim w_\nu{}^\star(\nu)$, thus $\tilde{w}_\nu^{(2)} \sim w_\nu^{(2)}$, which in turns imply that:

$$w^\star \circledast w \sim w_\tau^{(2)} \circledast w_\nu^{(2)}, \quad (4.20)$$

In particular, in the rectangular situation where $\Lambda=\Lambda_r$, $B=N\nu_r$ and $T=M\tau_r$ such that $NM \gg 1$, placing the QAM symbols on the lattice $\Lambda_{N,M}=\mathbb{Z}\,(\tau_r/N,0) \oplus \mathbb{Z}\,(0,\nu_r/M)$ yields:

$$y = \prod{}^\epsilon (w^\star \circledast w) \triangleright (x \cdot P) \sim x \cdot P, \quad (4.21)$$

thus allowing perfect reconstruction without equalization when the channel is AWGN. Next, we describe the input-output relation in the presence of a non-trivial channel $H=\Pi^{time}(h)$ where $h=h(\tau,\nu)$ is the delay Doppler impulse response. For the sake of the analysis, it is sufficient to assume that h is a single reflector, i.e., $h(\tau,\nu)=\delta(\tau-\tau_0,\nu-\nu_0)=\delta(\tau-\tau_0) \circledast \delta(\nu-\nu_0)$. In the following computation we use the short notations $\delta\tau_0=\delta(\tau-\tau_0)$ and $\delta\nu_0=\delta(\nu-\nu_0)$. Given an input $x \in \mathbb{C}\,(V/\Lambda)$, a direct computation reveals that the transmit-receive image $y=D \cdot H \cdot M(x)$ is given by:

$$y=\Pi^\epsilon(w^\star \circledast h \circledast w)^\triangleright (x \cdot P), \quad (4.22)$$

Our goal is to calculate an explicit formula for $w^\star \circledast h \circledast w$. To do that, we first write:

$$w^\star \circledast h \circledast w = w_\nu{}^\star \circledast w_\tau{}^\star \circledast \delta_{\tau_0} \circledast \delta_{\nu_0} \circledast w_\tau \circledast w_\nu \quad (4.23)$$
$$= w_\nu{}^\star \circledast L_{\tau_0}[w_\tau{}^\star] \circledast M_{\nu_0}[w_\tau] \circledast L_{\nu_0}[w_\nu]$$
$$= w_\nu{}^\star \circledast L_{\tau_0}[\tilde{w}_\tau^{(2)}] \circledast L_{\nu_0}[w_\nu],$$

where $\tilde{w}_\tau^{(2)}=w_\tau{}^\star \circledast M_{\nu_0}[w_\tau]$. In addition, we have:

$$w_\nu{}^\star \circledast L_{\tau_0}[\tilde{w}_\tau^{(2)}](\tau,\nu) = L_{\tau_0}[\tilde{w}_\tau^{(2)}](\tau) \otimes \psi(\tau\nu)w_\nu{}^\star(\nu) \quad (4.24)$$
$$= L_{T_0}[\tilde{w}_\tau^{(2)}](\tau) \otimes M_\tau[w_\nu{}^\star](\nu),$$

Hence, overall we can write:

$$w^\star \circledast h \circledast w(\tau,\nu)=L_{\tau_0}[\tilde{w}_\tau^{(2)}](\tau) \otimes L_{\nu_0}[\tilde{w}_\nu^{(2)}](\nu), \quad (4.25)$$

where $\tilde{w}_\nu^{(2)}=M_T[w_\nu{}^\star] \circledast w_\nu$. If we assume that $w_\tau$ and $w_\nu$ are Nyquist with respect to a bandwidth B and a duration T respectively, and, in addition have $B \cdot T \gg 1$ and $\nu_0 \ll B$ then we can approximate $\tilde{w}_\tau^{(2)} \sim w_\tau^{(2)}$ and $\tilde{w}_\nu^{(2)} \sim w_\tau^{(2)}$, which, in turns, imply:

$$w^\star \circledast h \circledast w = h * w_\tau^{(2)} * w_\nu^{(2)}, \quad (4.26)$$

B4.4 Channel acquisition Looking back at the input output relation $y=h_w \circledast (x \cdot P)$ where $h_w=w^\star \circledast h \circledast w$, we proceed to derive a simple acquisition scheme of the filtered channel impulse response $h_w$. To this end, we fix a point $v_0 \in V$ and consider the standard pulse structure $P(ag_1 + bg_2)=1$ for $0 \leq a, b \leq 1$. Given these choices, we define the pilot structure as the Zak waveform $\varphi$.

B4.5 Weak ZDMA In this subsection, we describe a weak variant of the ZDMA transceiver that can be architected as a pre-processing layer over multi-carrier transceiver. We refer to this transceiver as w-ZDMA. The definition of the w-ZDMA transceiver depends on similar parameters as the ZDMA transceiver we described before however, with few additional assumptions. First assumption is that the transmit and receive filters are periodic with period $\Lambda$, i.e., $w_{tx}, w_{rx} \in \mathcal{C}(V/\Lambda)$. in other words, $w_{tx/rx} = SF(W_{tx/rx})$ where $w_{tx}, w_{rx} \in \mathcal{C}(V/\Lambda)$ are discrete window functions and SF is the symplectic Fourier transform. The support of the window $W_{tx}$ determines the bandwidth and duration of the transmission packet. Typically, we take the receive filter to be matched $W_{rx} = \overline{W}_{tx}$ or, equivalently, that $w_{rx} = w_{tx}^\star$. Another assumption is that the generator signal $P \in H(V, \pi_\epsilon)$ satisfy the orthogonality condition:

$$P \cdot \overline{P} = 1, \quad (4.27)$$

We note that condition (4.27) is equivalent to Gabor orthogonality condition of the waveform $p = Z_{time,\epsilon}(P)$ with respect to the Heisenberg lattice Im $\hat{\epsilon} = \{(\lambda, \epsilon(\lambda)) : \lambda \in \Lambda\}$. To see this, let $\lambda \in \Lambda$ and consider the inner product $\langle p, \pi^{time}(\lambda, \epsilon(\lambda)) \triangleright p \rangle$.

Now write:

$$\langle p, \pi^{time}(\lambda, \epsilon(\lambda)) \triangleright p \rangle = \langle Z_{time,\epsilon}(P), \pi^{time}(\lambda, \epsilon(\lambda)) \triangleright Z_{time,\epsilon}(P) \rangle \quad (4.28)$$
$$= \langle Z_{time,\epsilon}(P), Z_{time,\epsilon}(\pi^\epsilon(\lambda, \epsilon(\lambda)) \triangleright P) \rangle_t$$
$$= \int_{V/\Lambda} \overline{P}(v)\{\pi^\epsilon(\lambda, \epsilon(\lambda)) \triangleright P\}(v)dv$$
$$= \int_{V/\Lambda} \psi(\omega(\lambda, v))\overline{P}(v)P(v)dv$$
$$= \int_{V/\Lambda} \psi(\omega(\lambda, v)) \cdot 1 dv$$
$$= \begin{cases} 1 & \lambda = 0 \\ 0 & \lambda \neq 0 \end{cases},$$

where in the second equality we use the fact $Z_{time,\epsilon}$ is an intertwining transform and in the fourth equality we use (2.5). Given an input function $x \in \mathcal{C}(V/\Lambda)$ encoding the information bits, we shape the band and duration of the transmitted waveform through periodic convolution with $w_{tx}$, i.e., $x \mapsto w_{tx}^\star x$. Overall, the signal x is modulated according to the following rule:

$$M(x) = Z_{time,\epsilon}((w_{tx}^\star x) \cdot P), \quad (4.29)$$

It is illuminating to compare Formula (4.29) with Formula (4.8). One observes that the main difference is in the way the shaping filter is applied where in ZDMA it is applied through the operation of twisted convolution $x \mapsto w_{tx} \circledast (x \cdot P)$ and in w-ZDMA through the operation of periodic convolution $x \mapsto (w_{tx}^\star x) \cdot P$. We next explain how the modulation rule (4.29) can be expressed as a layer over multi-carrier modulation scheme. To this end, let us write $w^\star x$ in the form $w^\star x = SF(W \cdot X)$ where $x = SF(X)$, that is:

$$w \ast x(v) = \sum_{\lambda \in \Lambda} \psi(-\omega(v, \lambda))W(\lambda) \cdot X(\lambda), \quad (4.30)$$

For every $v \in V$. Hence:

$$Z_{time,\epsilon}((w \ast x) \cdot P) = \sum_{\lambda \in \Lambda} W(\lambda) \cdot X(\lambda) Z_{time,\epsilon}(\psi(-\omega(v, \lambda))P) \quad (4.31)$$
$$= \sum_{\lambda \in \Lambda} W(\lambda) \cdot X(\lambda) Z_{time,\epsilon}(\psi(\omega(\lambda, v))P)$$
$$= \sum_{\lambda \in \Lambda} W(\lambda) \cdot X(\lambda) Z_{time,\epsilon}(\pi^\epsilon(\lambda, \epsilon(\lambda)) \triangleright P)$$
$$= \sum_{\lambda \in \Lambda} W(\lambda) \cdot X(\lambda) \pi^{time}(\lambda, \epsilon(\lambda)) \triangleright Z_{time,\epsilon}(P)$$
$$= \sum_{\lambda \in \Lambda} W(\lambda) \cdot X(\lambda) \pi^{time}(\lambda, \epsilon(\lambda)) \triangleright p$$
$$= \prod{}^{time}(\hat{\epsilon}_{pf}(W \cdot SF(x))) \triangleright p,$$

In case the Heisenberg character $\epsilon = 1$, e.g., when $\Lambda = \Lambda_r$ is rectangular, the modulation formula becomes $M(x) = \Pi^{time}(W \cdot SF(x))^\triangleright p$. We now proceed to describe the de-modulation rule implemented at the receiver side. Given a time domain waveform $\varphi_{rx}$, the receiver demodulates it according to the following formula:

$$D(\varphi_{rx}) = Z_{\epsilon,time}(\varphi_{rx}) \cdot \overline{P}, \quad (4.32)$$

Observe that when the channel is identity, due to the orthogonality condition (4.27), we obtain perfect reconstruction after composing modulation and demodulation:

$$D \circ M(x) = x \cdot P\overline{P} \quad (4.33)$$
$$= x \cdot 1$$
$$= x,$$

We further note that the orthogonality condition is not essential for achieving perfect reconstruction. In fact, one needs to impose is that P is non-degenerate, that is, that $P\overline{P}$ is nowhere vanishing. For non-degenerate P one can reconstruct the input x as:

$$x = D \cdot M(x)/P\overline{P},$$

The use of general non-degenerate generator functions give rise to non-orthogonal variants of the w-ZDMA transceiver. For a non-trivial channel transformation of the form $H = \pi^{time}(v_0)$ where $v_0 = (\tau_0, v_0)$ we get:

$$y = D \circ H \circ M(x) = D(\pi^{time}(v_0) \triangleright M(x)) \quad (4.34)$$
$$= Z_{\epsilon,time}(\pi^{time}(v_0) \triangleright M(x)) \cdot \overline{P}$$
$$= \{\pi^\epsilon(v_0) \triangleright Z_{\epsilon,time}(M(x))\} \cdot \overline{P}$$
$$= \{\pi^\epsilon(v_0) \triangleright x \cdot P\}\overline{P},$$

where the second equality is the definition of D, the third equality is the intertwining property of the Zak transform and the last equality is the definition of M. Finally, let $v = (\tau, v)$ where $0 \leq \tau, v < 1$ and evaluate y at $\tau$:

$$y(v) = \psi(-\beta(v_0, v_0))\psi(\beta(v_0, v))x(v - v_0)P(v - v_0)\overline{P}(v) \quad (4.35)$$

Assuming $v_0$ is small compared to the lattice dimensions and that P is a continuous function we get the approximation (The continuity assumption of G does not always hold, for example in the most common case when $G=Z^{-1}(1_{[0,T]})$—the case of the standard window function.)

$$y(v) \simeq x(v - v_0)P(v)\overline{P}(v) \qquad (4.36)$$
$$= x(v - v_0),$$

where for the approximation we used the fact that $\psi(\beta(v_0,v))$, $\psi(-\beta(v_0,v_0)) \cong 1$ and that $P(v-v_0) \cong P(v)$ by continuity. Note that when P corresponds to the standard window (see Example 2.2) the approximation (4.36) is no longer valid since P is not continuous at the boundaries of the fundamental cell. We leave it to the reader to compute the appropriate approximation in this case.

Figure 11:
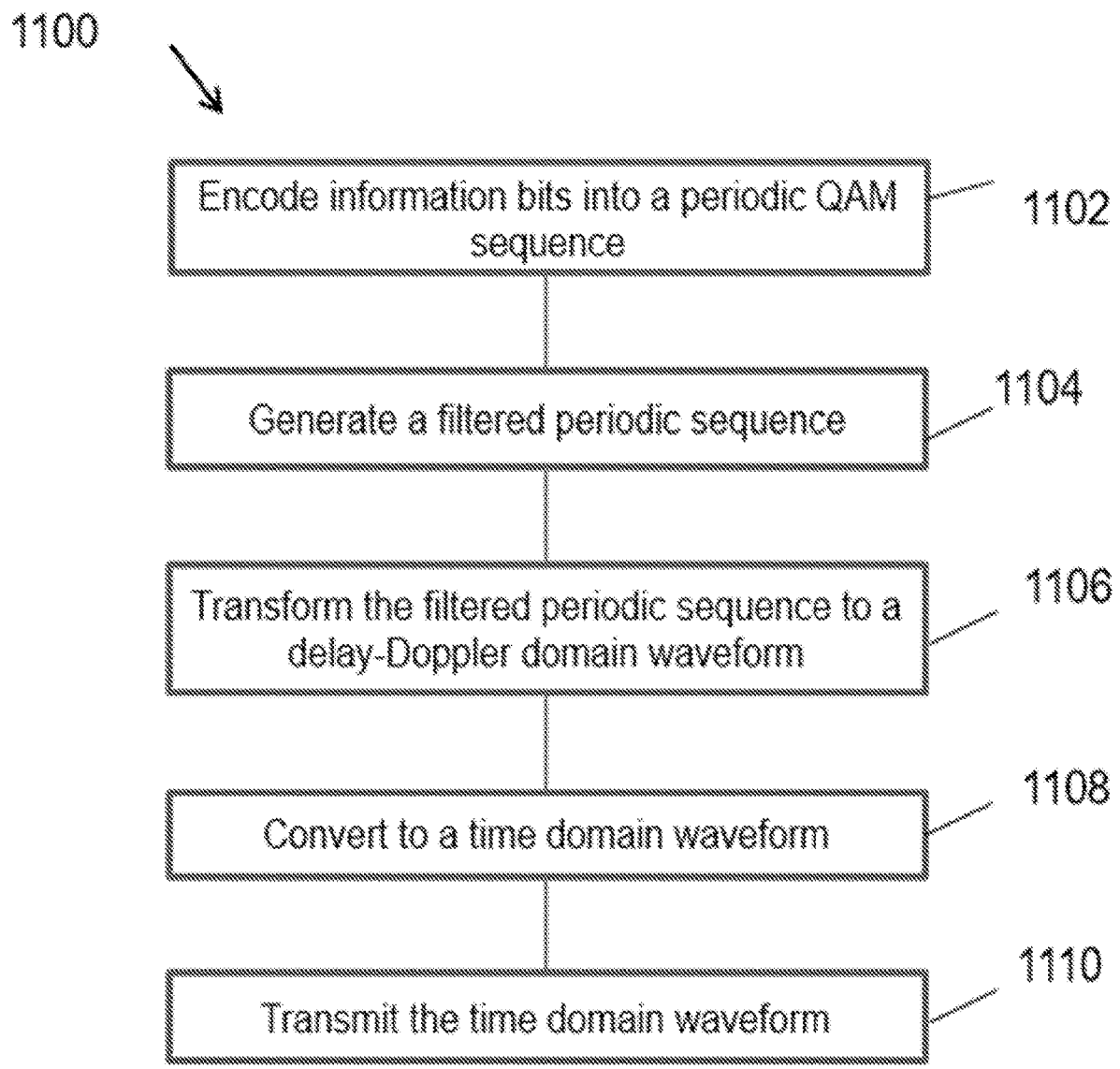
FIG. 11 is a flowchart representation of an example of a wireless communication method.

FIG. 11 is a flowchart representation of an example of a wireless communication method 1100. The method 1100 may be implemented at a transmitter-side in a wireless communication system. The method 1100 includes encoding (1102) information bits as a periodic sequence of quadrature amplitude modulation (QAM) symbols. For example, the periodic sequence may be periodic in the symbol period domain. For example, the periodicity may also be exhibited along the Doppler dimension in a delay-Doppler domain representation of the QAM-modulated data bits. The method 1100 includes convolving (1104) the periodic sequence with a periodic pulse function, thereby generating a filtered periodic sequence. For example, as described in Section A.0, the convolution operation may be mathematically represented as Fourier Transform or as a 1-D convolution with the sinc function. The method 1100 includes transforming (1106) the filtered periodic sequence to a delay-Doppler domain waveform, converting (1108) the delay-Doppler domain waveform to a time domain waveform; and transmitting (1110) the time domain waveform.

As described in the present document, the transforming operation 1106 may be performed by applying a Zak transform to the filtered periodic sequence. In some embodiments, the periodic pulse functions used in operation 1104 may include Dirichlet sinc function. Some examples are further described in Section A4.2 and with respect to FIG. 7 and FIG. 9. In some embodiments, a tapering window may be applied for the convolution operation. Some embodiments are described in Section A4.2.

In some embodiments, for example, as described in Section A.2, the encoding information bits as a periodic sequence incudes encoding the information bits as a two-dimensional periodic sequence having a periodicity of N in a first dimension and M in a second dimension, where N and M are integers.

Accordingly, in some embodiments, the time domain waveform as described with respect to operation 1110 may be transmitted over a wireless channel. The waveform may include a sequence of modulated QAM symbols, without having to add cyclic prefix. The time domain waveform may correspond to a mathematical equivalent of the results of operations 1102 to 1108. For example, in some embodiments, the generation operation 1104 may be followed by conversion to time domain waveform, without going through an intermediate delay-Doppler stage.

Figure 12:
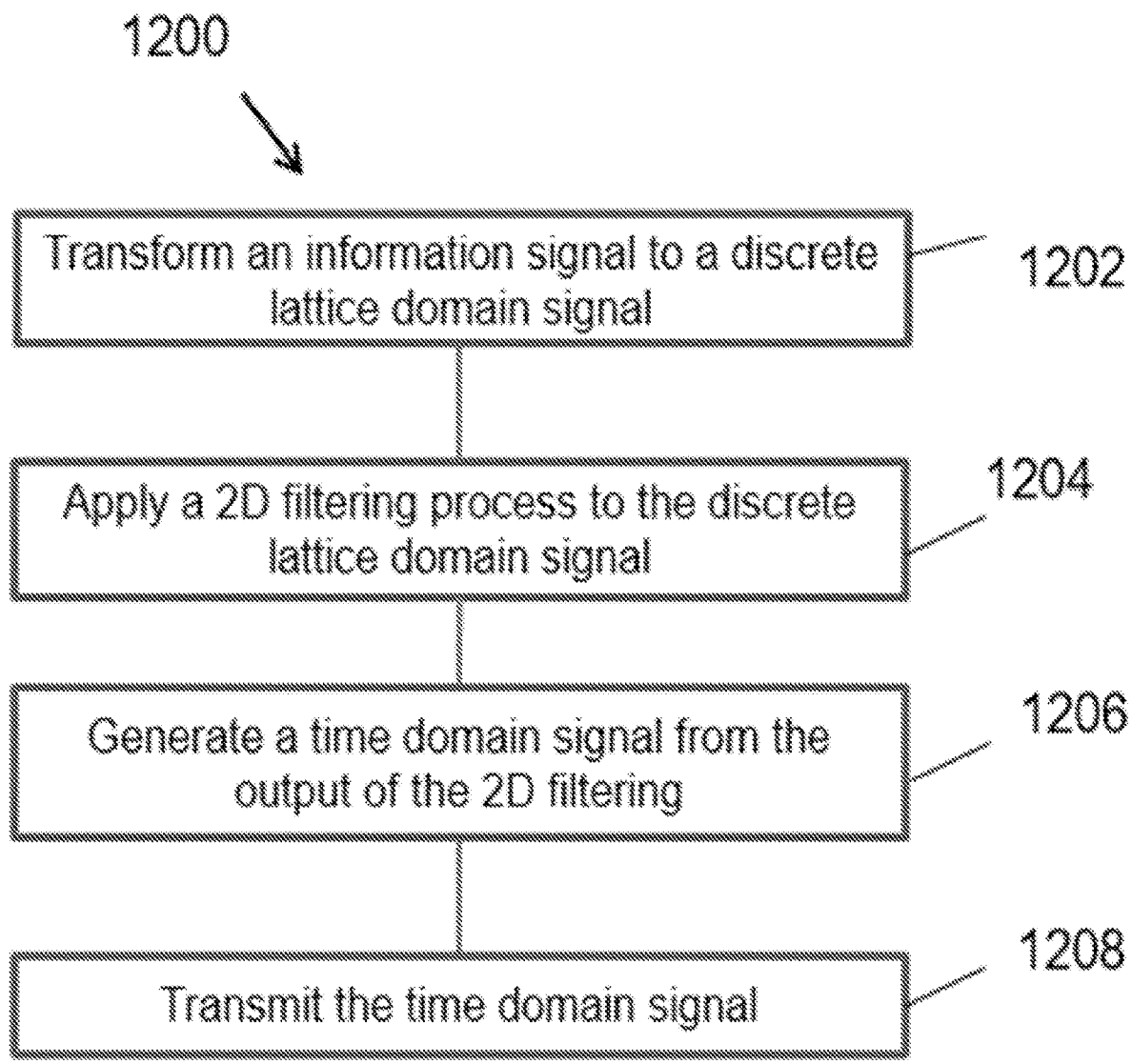
FIG. 12 is a flowchart representation of another example of a wireless communication method.

FIG. 12 is a flowchart representation of another example of a wireless communication method 1200. The method 1200 can be implemented by a wireless transmitter. The method 1200 includes transforming (1202) an information signal to a discrete lattice domain signal, shaping (1204) bandwidth and duration of the discrete lattice domain signal by a two-dimensional filtering procedure to generate a filtered information signal, generating (1206) a time domain signal from the filtered information signal, and transmitting (1208) the time domain signal over a wireless communication channel.

For example, in some implementations of the method 1200, the discrete lattice domain includes a Zak domain. As described further in Sections A and B, the two-dimensional filtering procedure includes a twisted convolution with a pulse. In some embodiments, the pulse is a separable function of each dimension of the two-dimensional filtering. Some example implementations are described in Sections A0, A3.

The method 1200 may be implemented by a transmitter device for transforming modulated signals that use QAM (or quadrature phase shift keyed) constellations and are generated using 2D filtered versions of a lattice domain signal. Notably, no cyclic prefixes are inserted within the periodic signal, thereby saving any overheads of transmission that are wasted in the conventional OFDM techniques. As previously discussed, the filtered periodic sequences, generated during the method 1100 also similarly eschew the use of cyclic prefixes, thereby saving overhead of traditional OFDM communication.

Figure 13:
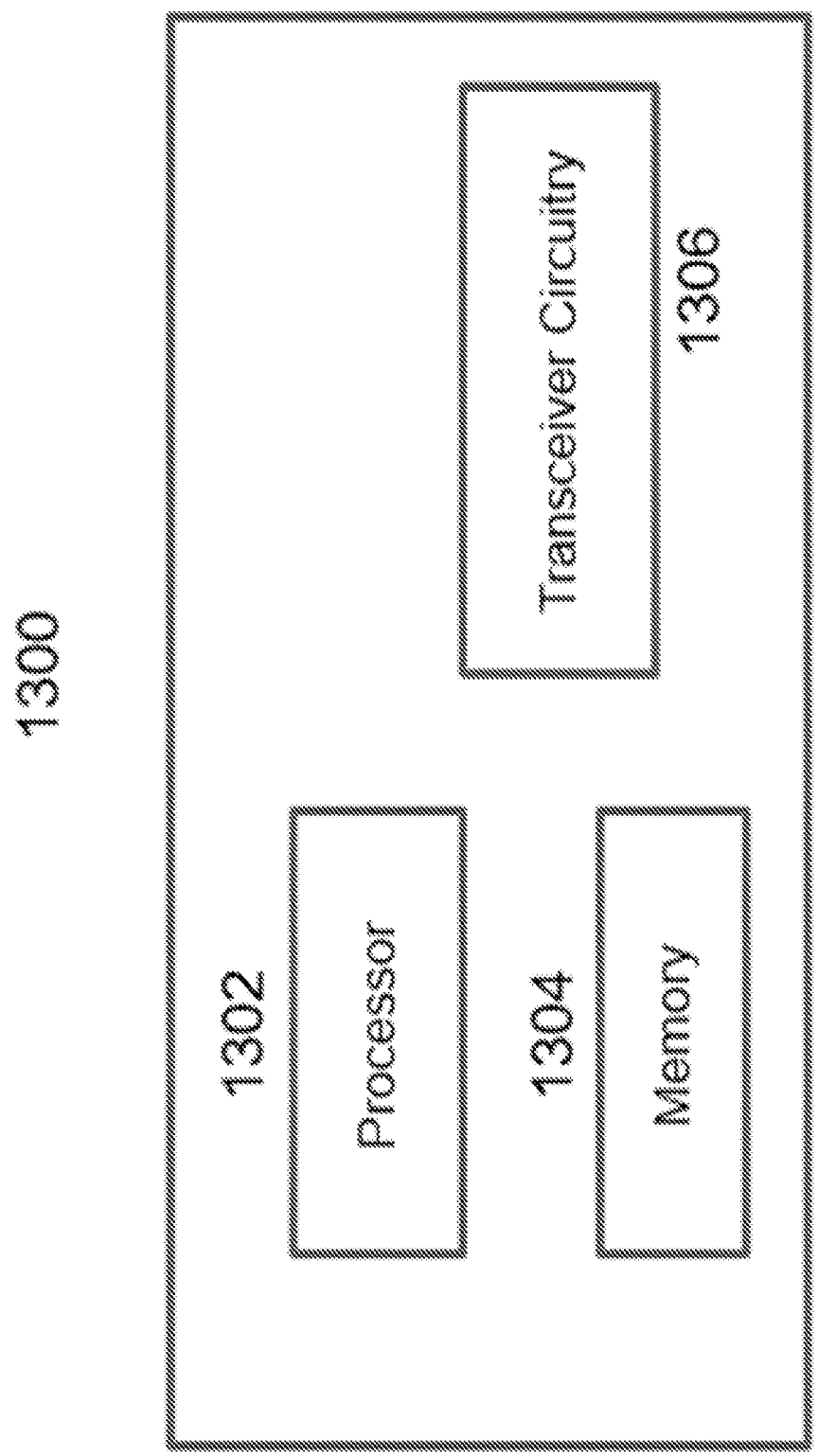
FIG. 13 shows an example of a wireless transceiver apparatus.

FIG. 13 shows an example of a wireless transceiver apparatus 1300. The apparatus 700 may be used to implement various techniques described herein. The apparatus 1300 includes a processor 1302, a memory 1304 that stores processor-executable instructions and data during computations performed by the processor. The apparatus 1300 includes reception and/or transmission circuitry 1306, e.g., including radio frequency operations for receiving or transmitting signal and/or receiving data or information bits for transmission over a wireless network.

It will be appreciated that techniques for data modulation are disclosed in which information signal can be transmitted using multiple QAM subcarriers without using a cyclic prefix. In some embodiments, a modulation technique, called OFDM-MultiCarrier (MC) may be used in which QAM symbols are convolved with a periodic pulse function. In some embodiments, a Zak domain representation of a signal is used for shaping bandwidth and duration of a modulated information signal.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
   transforming an information signal to a discrete lattice domain signal;
   shaping bandwidth and duration of the discrete lattice domain signal by a two-dimensional filtering procedure to generate a filtered information signal, wherein the two-dimensional filtering procedure includes a twisted convolution with a pulse;
   generating a time domain signal from the filtered information signal; and
   transmitting the time domain signal over a wireless communication channel.

2. The method of claim 1, wherein the discrete lattice domain includes a Zak domain.

3. The method of claim 1, wherein the pulse is a separable function of each dimension of the two-dimensional filtering.

4. The method of claim 1, wherein the time domain signal comprises modulated information signal without an intervening cyclic prefix.

5. The method of claim 4, wherein the modulated information signal uses quadrature amplitude modulation (QAM) symbols.

6. The method of claim 4, wherein the modulated information signal is based on an orthogonal time frequency space (OTFS) modulation or an OTFS multicarrier (OTFS-MC) modulation.

7. The method of claim 1, wherein the pulse is a sinc function.

8. A wireless communication method, implementable by a wireless communication apparatus, comprising:
   encoding information bits as a periodic sequence of quadrature amplitude modulation (QAM) symbols;
   convolving the periodic sequence with a periodic pulse function, thereby generating a filtered periodic sequence;
   transforming the filtered periodic sequence into a delay-Doppler domain waveform;
   converting the delay-Doppler domain waveform to a time domain waveform; and
   transmitting the time domain waveform.

9. The method of claim 8 wherein the transforming comprises applying a Zak transform.

10. The method of claim 8, wherein the periodic pulse function comprises a Dirichlet sinc function.

11. The method of claim 8, wherein the convolving the periodic pulse function comprises applying a tapering window function.

12. The method of claim 8, wherein the encoding information bits as a periodic sequence includes encoding the information bits as a two-dimensional periodic sequence having a periodicity of N in a first dimension and M in a second dimension, where N and M are integers.

13. A wireless signal transmission apparatus comprising a processor, wherein the processor is configured to implement a method comprising:
    transforming an information signal to a discrete lattice domain signal;

shaping bandwidth and duration of the discrete lattice domain signal by a two-dimensional filtering procedure to generate a filtered information signal, wherein the two-dimensional filtering procedure includes a twisted convolution with a pulse;

generating a time domain signal from the filtered information signal; and transmitting, using transmission circuitry, the time domain signal over a wireless communication channel.

14. The apparatus of claim 13, wherein the discrete lattice domain includes a Zak domain.

15. The apparatus of claim 13, wherein the pulse is a separable function of each dimension of the two-dimensional filtering.

16. The apparatus of claim 13, wherein the time domain signal comprises modulated information signal without an intervening cyclic prefix.

17. The apparatus of claim 16, wherein the modulated information signal uses quadrature amplitude modulation (QAM) symbols.

18. The apparatus of claim 16, wherein the modulated information signal is based on an orthogonal time frequency space (OTFS) modulation or an OTFS multicarrier (OTFS-MC) modulation.

19. The apparatus of claim 13, wherein the twisted convolution between a first function $h_1$ and a second function $h_2$ is defined as:

$$h_1 *_\sigma h_2(\upsilon) = \int_{\upsilon_1 + \upsilon_2 = \upsilon} \exp(j2\pi\beta(\upsilon_1, \upsilon_2)) h_1(\upsilon_1) h_2(\upsilon_2),$$

wherein $\beta$ is a polarization form.

20. The apparatus of claim 13, wherein the pulse is a sinc function.

* * * * *